(12) United States Patent
Kurita et al.

(10) Patent No.: US 9,348,662 B2
(45) Date of Patent: May 24, 2016

(54) NETWORK SYSTEM AND COMMUNICATION CONTROL METHOD

(71) Applicant: FUJITSU LIMITED, Kawasaki-shi (JP)

(72) Inventors: Toshihiko Kurita, Kawasaki (JP); Masatoshi Shiouchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 260 days.

(21) Appl. No.: 13/661,547

(22) Filed: Oct. 26, 2012

(65) Prior Publication Data

US 2013/0262647 A1 Oct. 3, 2013

(30) Foreign Application Priority Data

Mar. 29, 2012 (JP) ................................ 2012-078390

(51) Int. Cl.
*G06F 15/16* (2006.01)
*G06F 9/54* (2006.01)
*H04L 12/24* (2006.01)
*H04L 12/931* (2013.01)

(52) U.S. Cl.
CPC .............. *G06F 9/54* (2013.01); *H04L 41/0803* (2013.01); *H04L 49/70* (2013.01)

(58) Field of Classification Search
CPC ........................... H04L 41/0803; H04L 49/70
USPC ........................................................ 709/217
See application file for complete search history.

(56) References Cited

U.S. PATENT DOCUMENTS

| | | | | |
|---|---|---|---|---|
| 7,783,779 B1 * | 8/2010 | Scales | ................... | G06F 9/5077 709/207 |
| 8,027,354 B1 * | 9/2011 | Portolani | ................ | G04L 49/70 370/395.2 |
| 2005/0132062 A1 * | 6/2005 | Halme | ..................... | H04L 45/04 709/227 |
| 2010/0214949 A1 * | 8/2010 | Smith | ................... | H04L 45/586 370/254 |
| 2010/0287548 A1 * | 11/2010 | Zhou | ..................... | G06F 9/4856 718/1 |
| 2011/0246669 A1 | 10/2011 | Kanada et al. | | |
| 2012/0054367 A1 * | 3/2012 | Ramakrishnan | ...... | G06F 9/4856 709/242 |
| 2012/0124229 A1 * | 5/2012 | Sahu | ..................... | H04W 76/02 709/228 |

(Continued)

FOREIGN PATENT DOCUMENTS

| | | |
|---|---|---|
| JP | 2010-124129 | 6/2010 |
| JP | 2011-210032 | 10/2011 |

OTHER PUBLICATIONS

Office Action issued by the Japanese Patent Office on Oct. 27, 2015 in corresponding Japanese patent application No. 2012-078390.
Haruki Takahashi et al., "Study on the Virtual Machine Migration Scheme for the Realization of Follow the SUN Data Center," Technical Report of The Proceeding of the Institute of Electronics, Information and Communication Engineers, Oct. 25, 2010, vol. 110, No. 264, pp. 29-34.

*Primary Examiner* — Karen Tang
(74) *Attorney, Agent, or Firm* — Staas & Halsey LLP

(57) ABSTRACT

A communication control method for a network system includes establishing a first communication path from a first virtual machine to be executed at a first information processing device to a second virtual machine to be executed at a second information processing device, using a plurality of switch devices, and establishing a second communication path from the first information processing device to a third information processing device using the plurality of switch devices, which differs from the first communication path, before moving the second virtual machine from the second information processing device to the third information processing device.

14 Claims, 16 Drawing Sheets

(56) References Cited

U.S. PATENT DOCUMENTS

2012/0137292 A1* 5/2012 Iwamatsu ............ G06F 9/45558 718/1

2012/0275328 A1* 11/2012 Iwata .................. H04L 12/4633 370/252

2013/0138764 A1* 5/2013 Satapathy ............ G06F 9/45558 709/214

* cited by examiner

FIG. 8

| ID NUMBER | DESTINATION MAC ADDRESS | OUTPUT INTERFACE |
|---|---|---|
| 1 | 00-90-27-AA-74-E0 | a |
| 2 | 00-90-27-AA-74-E1 | b |
| 3 | 00-90-27-AA-90-E0 | c |

FIG. 9A

| ID NUMBER | DESTINATION MAC ADDRESS BEFORE CONVERSION (MAC ADDRESS OF VM TO BE MOVED) | DESTINATION MAC ADDRESS AFTER CONVERSION (VIRTUAL MAC ADDRESS) |
|---|---|---|
| 1 | 00-90-27-AA-74-E0 | 00-90-27-AA-90-E0 |
| 2 | 00-90-27-AA-74-E1 | 00-90-27-AA-90-E1 |

FIG. 9B

| ID NUMBER | DESTINATION MAC ADDRESS BEFORE CONVERSION (VIRTUAL MAC ADDRESS) | DESTINATION MAC ADDRESS AFTER CONVERSION (MAC ADDRESS OF VM TO BE MOVED) |
|---|---|---|
| 1 | 00-90-27-AA-90-E0 | 00-90-27-AA-74-E0 |
| 2 | 00-90-27-AA-90-E1 | 00-90-27-AA-74-E1 |

FIG. 12A

| ID NUMBER | DESTINATION MAC ADDRESS | OUTPUT INTERFACE |
|---|---|---|
| 1 | 00-90-27-AA-74-E0 (A0) | if_0 |
| 2 | 00-90-27-AA-90-E0 (M0) | if_1 |

FIG. 12B

| ID NUMBER | DESTINATION MAC ADDRESS | OUTPUT INTERFACE |
|---|---|---|
| 2 | 00-90-27-AA-90-E0 (M0) | if_1 |
| 3 | 00-90-27-AA-74-E0 (A0) | if_1 |

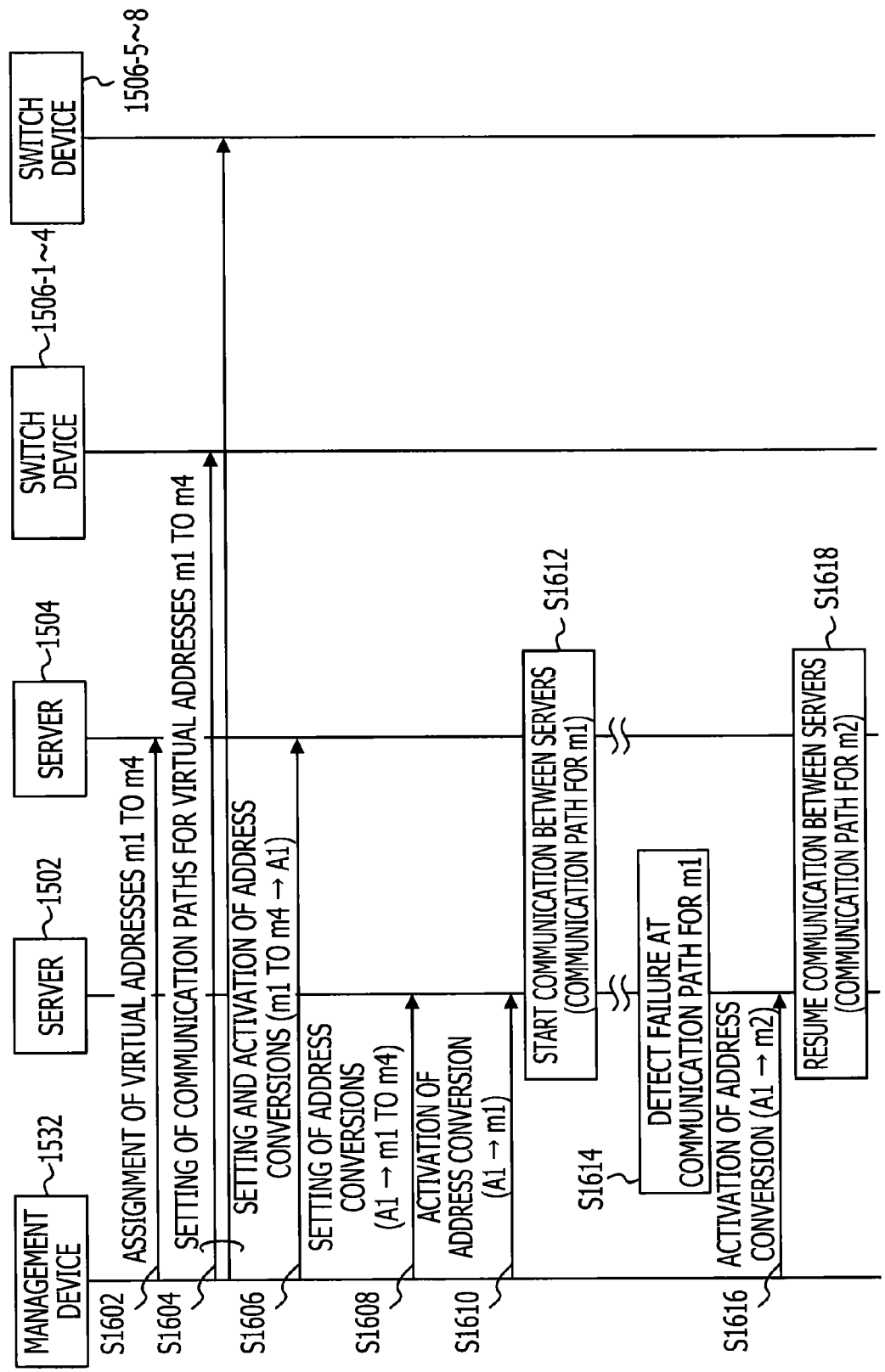

NETWORK SYSTEM AND COMMUNICATION CONTROL METHOD

CROSS-REFERENCE TO RELATED APPLICATION

This application is based upon and claims the benefit of priority of the prior Japanese Patent Application No. 2012-78390, filed on Mar. 29, 2012, the entire contents of which are incorporated herein by reference.

FIELD

The embodiments discussed herein are related to a network system and a communication control method.

BACKGROUND

A network system such as a data center network or the like includes multiple servers to which a virtual machine (Virtual Machine, hereafter also referred to as VM) is provided, and multiple switch devices. With such a network system, in the event that a certain VM has been moved from a server to which the VM thereof has belonged so far to another server by live migration (Live Migration), the servers and switch devices making up the net work have to newly establish a communication path as to the VM after movement.

Therefore, the servers and switch devices transmit an ARP (Address Resolution Protocol) request to the moved VM. This ARP request is transmitted to the entire network to which the server belongs to which the VM after movement belongs, using broadcasting. When receiving an ARP request, the server to which the VM after movement belongs transmits an ARP response based on a MAC (Media Access Control) address of the VM thereof.

The servers and switch devices learn, according to reception of the ARP response, a correspondence relation between a MAC address included the ARP response and output interface of the own device in an autonomic dispersive manner to obtain setting information (forwarding information) regarding the VM after movement. Hereafter, with regard to a node device such as a VM or the like, learning of a correspondence relation between a MAC address thereof and the output interface of the own device may simply be referred to as MAC address learning. The servers and switch devices perform MAC address learning regarding the moved VM, thereby updating a forwarding information table in which forwarding information (setting information) of traffic data is stored.

Also, as a technique to update setting information at a switch device when a VM is moved by live migration, a technique called AMPP (Automatic Migration of Port Profile) has been widely recognized. The AMPP is a protocol formulated by IEEE (IEEE 802.IQbg). According to the AMPP, in response to movement of a VM by live migration, a port profile (setting information) within a switch device on the lowest stage coupled to a movement source server of the VM is moved to a switch device on the lowest stage coupled to a movement destination server.

FIG. 1 is a diagram for describing operation of the AMPP.

As illustrated in FIG. 1, with an L2 (layer 2) network system 100, servers 102-1 and 102-2 are coupled to an L2 switch network 106 via corresponding switch devices 104-1 and 104-2, respectively. The server 102-1 includes a VM 112-1 (before movement by live migration), a VM 112-2, and a virtual switch 114-1, and the server 102-2 includes a VM 112-1 (after movement by live migration), a VM 112-3, and a virtual switch 114-2. Each of the VMs 112-1 to 112-3 is coupled to the corresponding switch device 104-1/104-2 via the corresponding virtual switch 114-1/114-2.

The switch devices 104-1 and 104-2 are, of switch devices having a multi-stage configuration making up the network system 100, physical switches positioned on the lowest stage which may be coupled to the servers 102-1 and 102-2 without passing through another switch device, respectively. Each of the switch devices 104-1 and 104-2 internally includes a port profile (setting information). The port profile indicates a correspondence relation between a MAC address assigned to each of the VMs and an output port (output interface) of the own device.

As illustrated in FIG. 1, with an example wherein the VM 112-1 belonging to the server 102-1 has been moved to the other server 102-2 by live migration, in response to the VM 112-1 moving from the server 102-1 to the server 102-2, a port profile 116 within the switch device 104-1 on the lowest stage coupled to the server 102-1 is moved to the switch device 104-2 on the lowest stage coupled to the server 102-2.

The switch devices 104-1 and 104-2 on the lowest stage perform MAC address learning regarding the VM after movement according to movement of the port profile (setting information) by the AMPP, and update the forwarding information table in which forwarding information (setting information) of traffic data is stored.

On the other hand, switch devices other than the lowest stage (multiple switch devices making up the L2 switch network) execute, as described above, according to reception of an ARP response, MAC address learning regarding the moved VM, thereby updating the forwarding information table.

Note that a technique has been described in Japanese Laid-open Patent Publication No. 2010-124129 wherein, in the event of moving a VM, a MAC address of the VM to be moved is assigned to a physical interface of a movement destination server, and the switches making up a network are made to learn the assigned MAC address prior to movement of the VM.

SUMMARY

According to an aspect of the invention, a communication control method for a network system includes establishing a first communication path from a first virtual machine to be executed at a first information processing device to a second virtual machine to be executed at a second information processing device, using a plurality of switch devices, and establishing a second communication path from the first information processing device to a third information processing device using the plurality of switch devices, which differs from the first communication path, before moving the second virtual machine from the second information processing device to the third information processing device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram indicating an example of a forwarding information table;

FIGS. 9A and 9B are diagrams indicating an example of an address conversion table;

FIGS. 12A and 12B are diagrams indicating an example of a forwarding information table;

FIG. 16 is a sequence chart illustrating the communication control processing in the data center network system according to the third embodiment;

DESCRIPTION OF EMBODIMENTS

First, consideration of related techniques according to the present inventor and others will be described. With the method wherein at the time of movement of a VM according to live migration, in response to reception of an ARP response, MAC address learning is performed, and the forwarding information table is updated, during a period from completion of movement of a VM until all of the switch devices making up the network complete MAC address learning, a communication path as to the moved VM fails to be established, and communication as to the VM thereof becomes a disrupted state.

Also, with a method to perform, at the time of movement of a VM according to live migration, MAC address learning in accordance with the AMPP to update the forwarding information table, during a period until movement of a port profile (setting information) is completed, a communication path as to the moved VM also fails to be established, and communication as to the VM thereof becomes a disrupted state.

Further, according to reception of an ARP response, switch devices other than the lowest stage perform MAC address learning, in the same way, during a period after completion of movement of the VM until the switch devices other than the lowest stage complete MAC address learning, a communication path as to the moved VM also fails to be established, and communication as to the VM thereof becomes a disrupted state.

Hereafter, embodiments of the present technology will be described.

Note that, with the following embodiments and application examples, though description will be made with reference to a data center network system as a system example to which the present technology is to be applied, the present technology is not restricted to this example, and the present technology may widely be applied to network systems including servers and switch devices and so forth.

1. First Embodiment

Hereafter, a network system and a communication control method according to a first embodiment will be described.

1-1. Configuration of Data Center Network System 200

Figure 1:
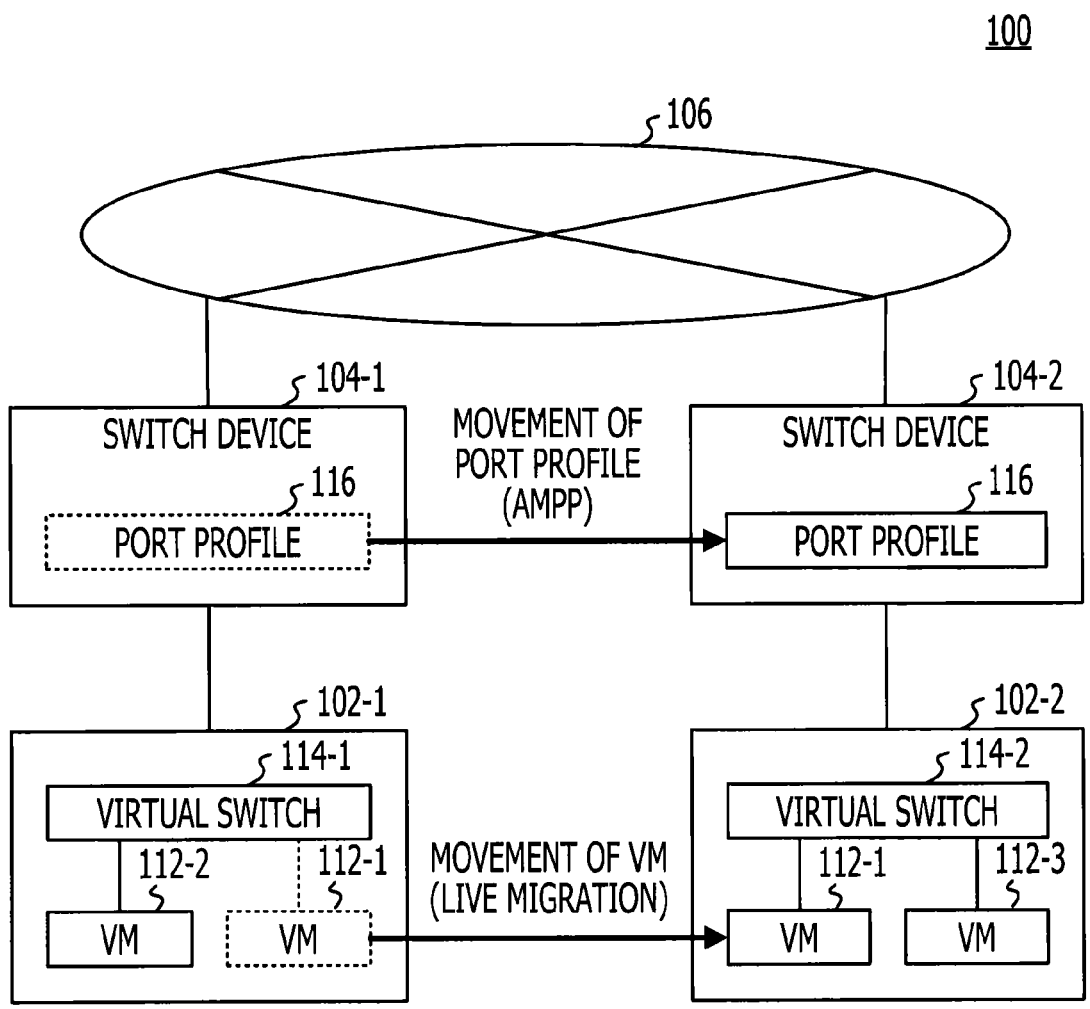
FIG. 1 is a diagram for describing operation of AMPP (Automatic Migration of Port Profile)
Figure 2:
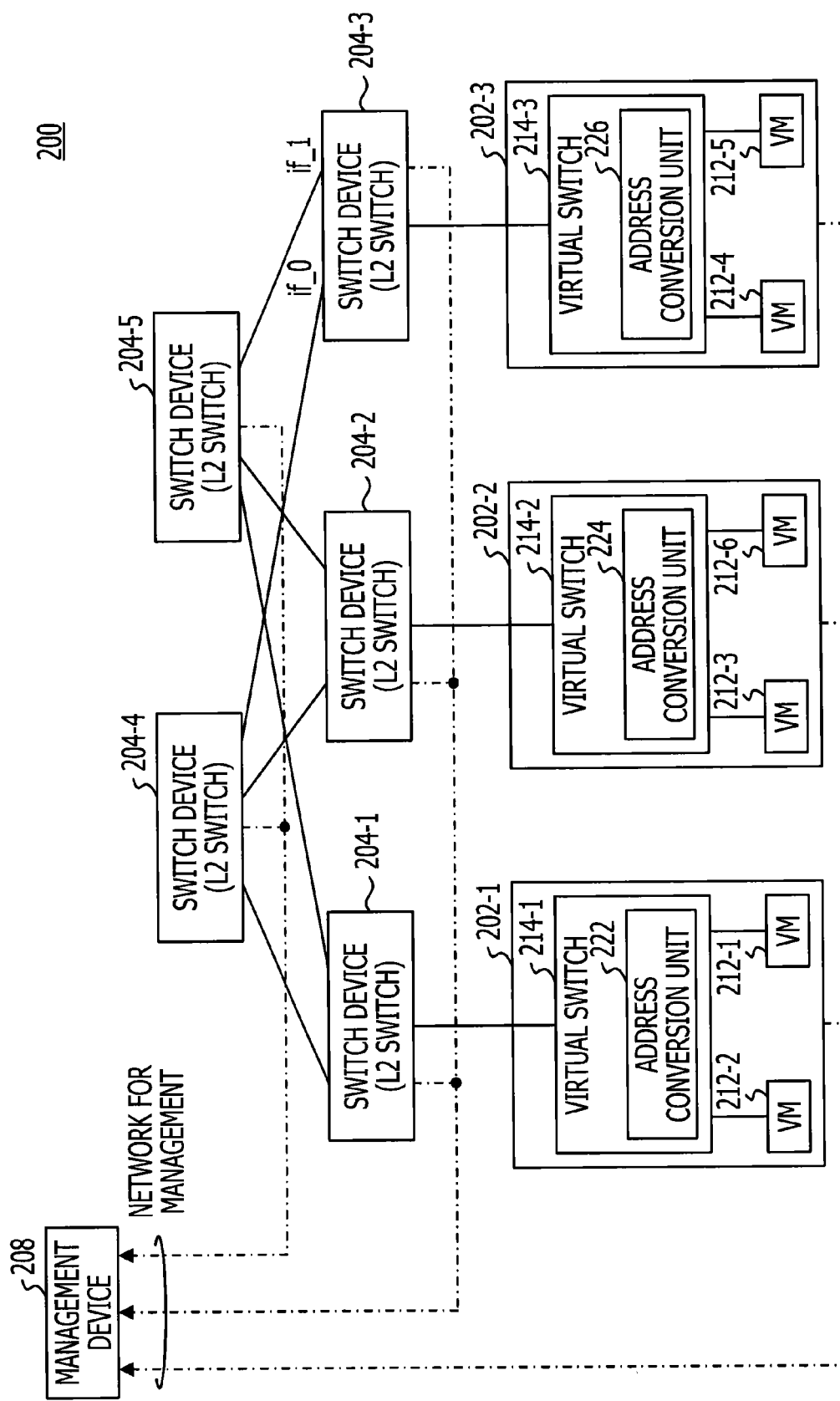
FIG. 2 is a diagram illustrating of a configuration of a data center network system according to a first embodiment.

FIG. 2 is a diagram illustrating of a configuration of a data center network system 200 according to the first embodiment. Hereafter, a schematic configuration of the data center network system 200 will be described.

As illustrated in FIG. 2, the data center network system 200 is a centralized network system based on the control of a management device 208, and includes multiple node apparatuses including servers 202-1 to 202-3 and switch devices 204-1 to 204-5, and the management device 208. The servers 202-1 to 202-3 and switch devices 204-1 to 204-3 are coupled via a network line for data communication illustrated in a solid line in FIG. 2.

The switch devices 204-1 to 204-5 are physical switches configured to serve as network repeaters, and are layer 2 switches (L2 switches). Each of the switch devices 204-1 to 204-5 has a forwarding information table in which forwarding information of traffic data is stored. The forwarding information table is a table in which information indicating a correspondence relation between a MAC address indicating a destination of traffic data and an output interface of the switch device having the forwarding information table thereof is stored. The MAC address is an example of a physical address assigned to a VM. The switch devices 204-1 to 204-5 do not perform MAC address learning, and the management device 208 writes forwarding information in each of the switch devices 204-1 to 204-5 in a centralized manner.

The switch devices 204-1 to 204-5 receive traffic data from a server or another switch device. The switch devices 204-1 to 204-5 perform well-recognized switching control based on the communication protocol of the layer 2 (data link layer) with reference to the forwarding information table, and decides an output interface to output the received traffic data.

Each of the servers 202-1 to 202-3 includes at least one virtual switch and multiple virtual machines (VMs). For example, the server 202-1 includes one virtual switch 214-1 and two VMs 212-1 and 212-2. The VMs 212-1 and 212-2 are each coupled to the corresponding switch device 204-1 via the virtual switch 214-1. This is also true with the servers 202-2 and 202-3.

Each of the servers 202-1 to 202-3 moves, as will be described later, a VM decided to be moved by the management device 208 to another server based on instruction information from the management device 208 using live migration. Details of movement of a VM according to live migration will be described later.

The virtual switches 214-1 to 214-3 are virtually provided network repeaters to be realized by a processor at the corresponding sever executing a given program, and are layer 2 (L2) switches. Each of the virtual switches 214-1 to 214-3 has, similar to the switch devices 204-1 to 204-5, a forwarding information table in which forwarding information of traffic data is stored. The virtual switches 214-1 to 214-3 receive traffic data from a VM or switch device. The virtual switches 214-1 to 214-3 perform switching control based on the communication protocol of the layer 2 (data link layer) with reference to the forwarding information table, and decide an output interface to output the received traffic data.

Further, the virtual switches 214-1 to 214-3 include the address conversion units 222, 224, and 226, respectively. The servers 202-1 to 202-3 receive, in the event that the own device is a movement destination server of a VM to be moved, information of a virtual MAC address assigned to the own device, and activate the corresponding address conversion unit 222/224/226. The activated address conversion unit 222/224/226 performs conversion processing of a MAC address included in the traffic data received by the corresponding virtual switch 214-1/214-2/214-3 based on the virtual MAC address assigned by the management device 208.

In the event that the corresponding virtual switch 214-1/214-2/214-3 has received traffic data from either of the corresponding two VMs of the VMs 212-1 to 212-6, the address conversion unit 222/224/226 converts, with the traffic data thereof, a MAC address indicating a VM serving as a destination thereof (destination MAC address) into a virtual MAC address specified by the management device 208. Which destination MAC address corresponding to which VM as a conversion target is specified by the management device 208 as will be described later.

Also, in the case that the corresponding virtual switch 214-1/214-2/214-3 has received traffic data from the corresponding switch device 204-1/204-2/204-3, and when a destination MAC address of the traffic data thereof is a virtual MAC address specified by the management device 208, the corresponding address conversion unit 222/224/226 converts the virtual MAC address thereof into a MAC address corresponding to either of the corresponding two VMs of the VMs 212-1 to 212-6 coupled to the corresponding virtual switch 214-1/214-2/214-3. The virtual MAC address is to be converted into a MAC address corresponding to a VM, and which VM is specified by the management device 208.

Each of the VMs 212-1 to 212-6 establishes connection with another VM, and performs communication of traffic data with the VM with which connection has been established. In the event that connection has been established between two VMs, a communication path passed through the corresponding virtual switch 214-1/214-2/214-3 and at least one of the switch devices 204-1 to 204-5 is established between the two VMs thereof. Each communication path is established as a result of the above-mentioned switching control being executed at each of the switch devices and virtual switches positioned on the communication path thereof.

The management device 208 is coupled to the servers 202-1 to 202-3 and the switch devices 204-1 to 204-5 via a network line for management illustrated in a dashed-dotted line in FIG. 2. The network lines for management illustrated in a dashed-dotted line are lines independent from the network lines for data communication illustrated in a solid line.

The management device 208 receives management information from the servers 202-1 to 202-3 via the network line for management. Examples of the management information includes information indicating the contents of communication being performed between two VMs of the VMs 212-1 to 212-6 belonging to the corresponding server 202-1/202-2/202-3, and including a MAC address assigned to a VM serving as a communication destination, and a MAC address assigned to a VM serving as a transmission source, and so forth. The management device 208 monitors between which VMs communication is being performed in the data center network system 200 based on the received management information.

The management device 208 manages, regarding the multiple VMs belonging to the corresponding server 202-1/202-2/202-3 making up the data center network system 200, generation, deletion, and movement thereof. The management device 208 decides a VM to be moved, and also decides a server serving as a movement destination of the VM to be moved thereof, thereby controlling execution of VM live migration. The management device 208 transmits instruction information indicating that the VM to be moved is moved using live migration, to the movement source server and movement destination server of the VM to be moved, via the network line for management.

Further, the management device 208 generates the above-mentioned virtual MAC address, and informs the generated virtual MAC address to the servers 202-1 to 202-3 via the network line for management. The virtual MAC address is a MAC address to be temporarily used in the event that movement of a VM according to live migration has occurred. The management device 208 assigns a virtual MAC address to the movement destination server of the VM to be moved according to live migration. The management device 208 transmits the assigned virtual MAC address to the movement destination server of the VM to be moved via the network line for management. Also, the management device 208 transmits instruction information indicating to activate an address conversion unit included in the corresponding virtual switch, to the movement destination server of the VM to be moved, via the network line for management.

1-2. Communication Control Method of Data Center Network System 200

Next, at the time of movement of a VM according to live migration, a communication control method to be performed in the data center network system 200 will be described.

With the following description, description will be made with a case where in the data center network system 200, under a state in which a communication path is established between two VMs of the multiple VMs 212-1 to 212-6 belonging to the corresponding server 202-1/202-2/202-3, a VM serving as a destination (destination VM) has been moved, as an example, but even in the event that a VM serving as a transmission source (transmission source VM) has been moved, a similar communication control method will be executed.

1-2-1. Setting of Communication Path Using Virtual MAC Address

Description will be made regarding a communication control method to be performed in the data center network system 200 before and after a VM is moved according to live migration, with reference to FIGS. 3 and 4.

Figure 3:
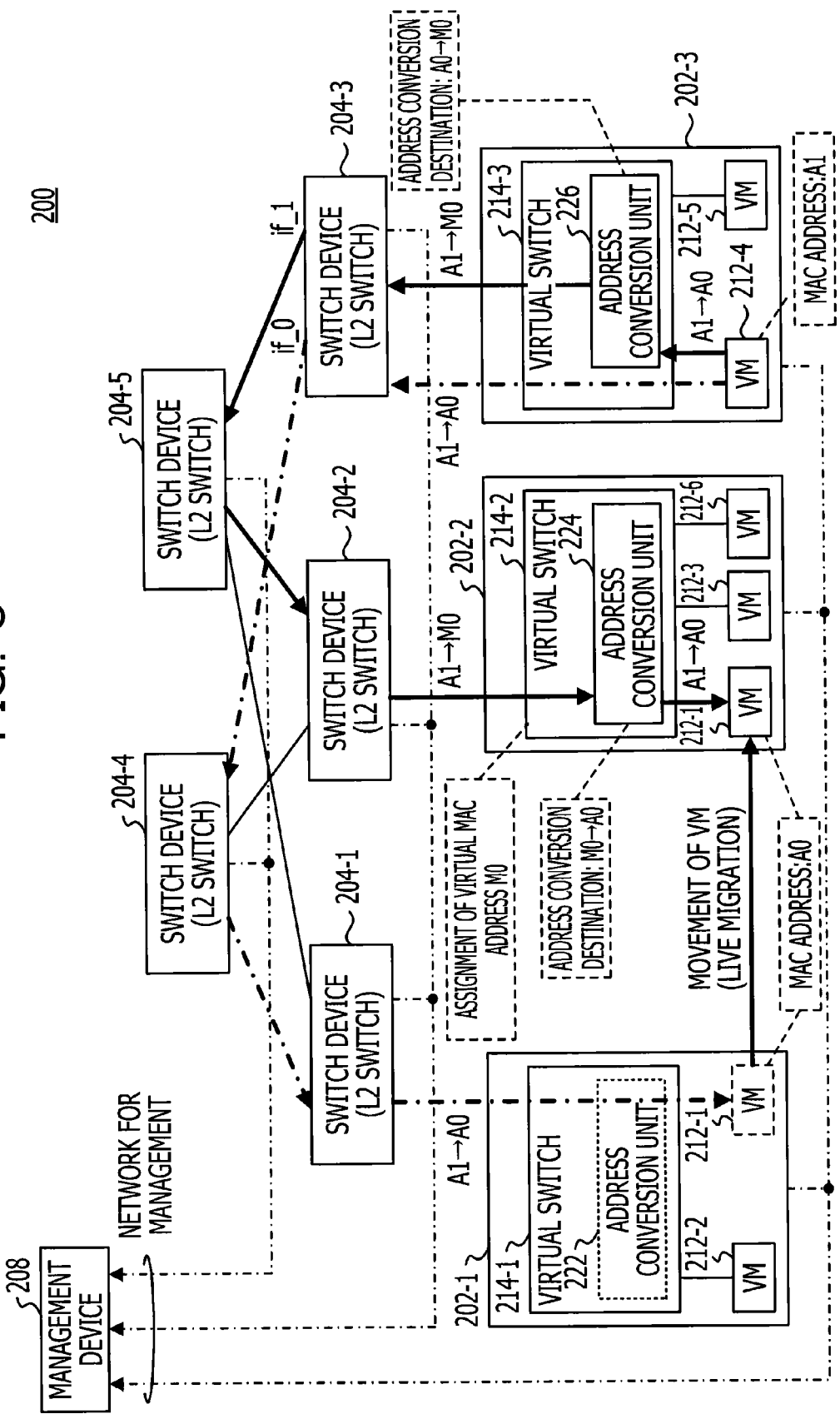
FIG. 3 is a system configuration diagram for describing communication path setting processing according to a virtual MAC address to be executed before and after movement of a VM.

FIG. 3 is a system configuration diagram for describing communication path setting processing using a virtual MAC address to be executed before and after movement of a VM. FIG. 4 is a sequence chart illustrating the communication path setting processing using a virtual MAC address to be executed before and after movement of a VM.

First, description will be made regarding the state of the data center network system 200 before movement of a VM occurs.

With the example illustrated in FIG. 3, before movement of a VM, as illustrated in a heavy dashed-dotted line, a communication path is established between the VM 212-1 belonging to the server 202-1 and the VM 212-4 belonging to the server 202-3, and communication from the VM 212-4 to the VM 212-1 is being performed. A MAC address "A0" has been assigned to the VM 212-1 serving as a destination, and a MAC address "A1" has been assigned to the VM 212-4 serving as a transmission source.

Each of the switch devices 204-1 to 204-5 stores information indicating a correspondence relation between the MAC address "A0" of the destination VM 212-1 and an output interface corresponding to the destination MAC address "A0" in the internal forwarding information table. For example, as illustrated in FIG. 3, the switch device 204-3 correlates, with the internal forwarding information table, an interface if_0 as an output interface corresponding to the MAC address "A0" of the destination VM 212-1. Details of the forwarding information table will be described later.

The management device 208 receives management information indicating the contents of communication between the VMs 212-1 and 212-4 from the servers 202-1 and 202-3 via the network line for management. The management device 208 recognizes based on the received management information that communication from the VM 212-4 to the VM 212-1 is being performed.

Note that, with a stage before movement of the VM, at each of the servers 202-1 to 202-3, the corresponding address conversion 222/224/226 is not activated, and the above-mentioned MAC address conversion processing has not been executed.

Figure 4:
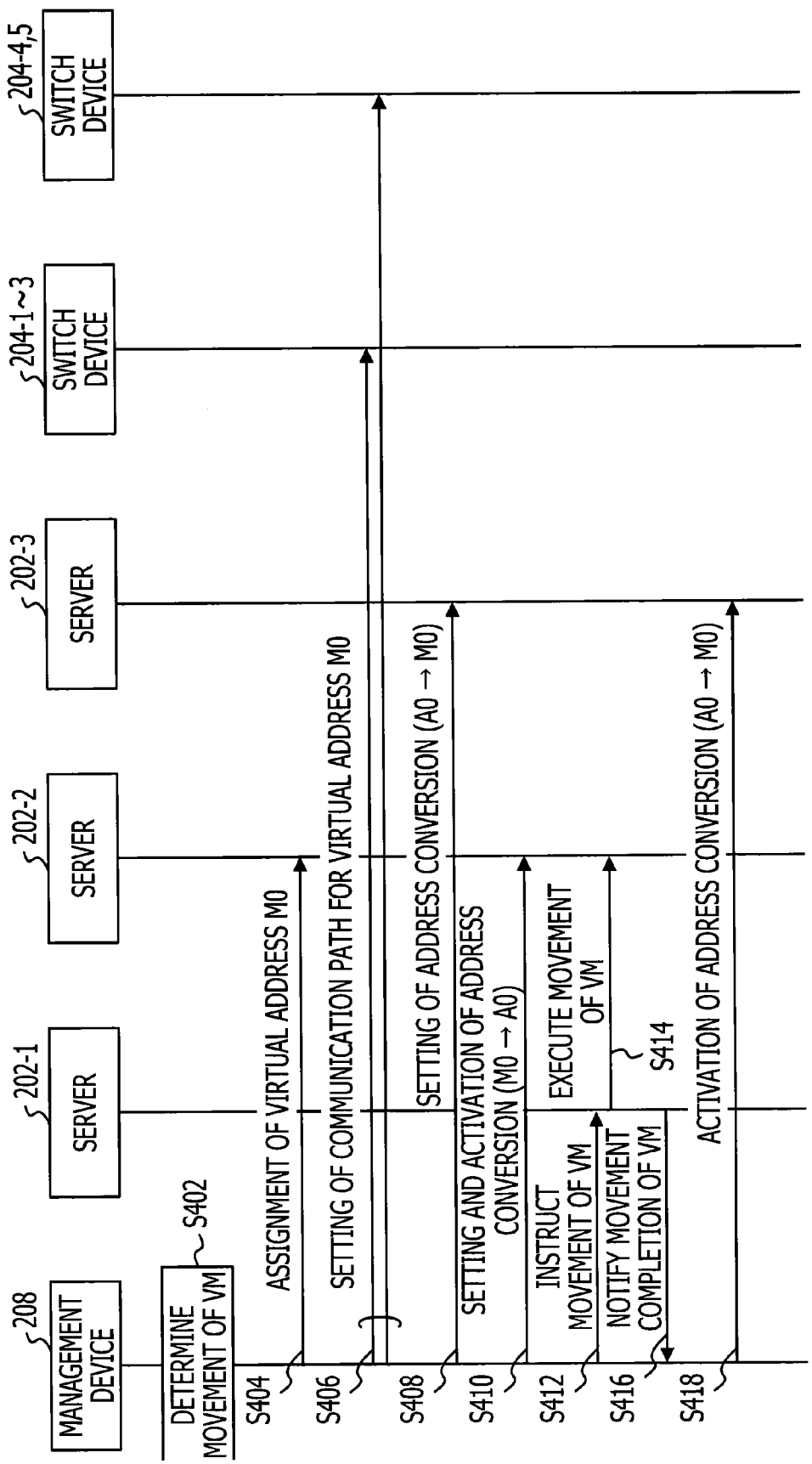
FIG. 4 is a sequence chart illustrating the communication path setting processing according to a virtual MAC address to be executed before and after movement of a VM.

Under the above-mentioned state, as illustrated in FIG. 4, in step S402, the management device 208 decides to move the VM 212-1 from the server 202-1 to the server 202-2. For example, the management device 208 decides, regarding the VM 212-1 to be moved, execution of live migration from the server 202-1 to the server 202-2. The management device 208 decides movement of the VM 212-1 according to live migration in the light of various factors such as computation processing load at the server 202-1, communication path load as to the server 202-1, and so forth. The management device 208 instructs the servers 202-1 and 202-2 to move the VM 212-1 from the server 202-1 to the server 202-2 using live migration via the network line for management.

Next, in step S404, the management device 208 recognizes that the VM 212-1 decided to be the VM to be moved in step S402 serves as a destination VM in communication currently being executed between the VM 212-1 and VM 212-4.

The management device 208 assigns a virtual MAC address to the movement destination server 202-2 of the VM 212-1 to be moved. With the example illustrated in FIG. 3, the management device 208 assigns a virtual MAC address "M0" to the server 202-2 which is the movement destination sever of the VM 212-1 to be moved serving as a destination VM in the communication between the VM 212-4 and VM 212-1. The management device 208 transmits information of the assigned virtual MAC address "M0" to the movement destination server 202-2 via the network line for management.

The movement destination server 202-2 receives the information of the virtual MAC address "M0" assigned to the own device from the management device 208. The movement destination server 202-2 assigns the received virtual MAC address "M0" to the internal virtual switch 214-2.

Next, in step S406, the management device 208 transmits, via a management network line, an instruction message to instruct the switch devices 204-1 to 204-5 included in the data center network system 200 to set the communication path to the virtual MAC address "M0" assigned to the virtual switch 214-2 in step S404. The virtual MAC address "M0", and also information of the corresponding output interface are included in the instruction message from the management device 208.

Each of the switch devices 204-1 to 204-5 receives the instruction message to instruct to set the communication path to the virtual MAC address "M0" from the management device 208 via the network line for management. Each of the switch devices 204-1 to 204-5 adds the virtual MAC address "M0", and the information indicating a correspondence relation of the output interface corresponding to the virtual MAC address "M0" thereof to the internal forwarding information table based on the received instruction message.

For example, as illustrated in FIG. 3, the switch device 204-3 correlates, with the internal forwarding information table, the virtual MAC address "M0" with an interface if 1 as an output interface corresponding to the virtual MAC address "M0". Details of the forwarding information table will be described later.

In the event of updating of the forwarding information table being completed at each of the switch devices 204-1 to 204-5, with the example illustrated in FIG. 3, a communication path as to the virtual switch 214-2 having the virtual MAC address "M0" is established, as illustrated in a heavy solid line, between the switch devices 204-2, 204-3, and 204-5 and the virtual switches 214-2 and 214-3. That is to say, traffic data having the virtual MAC address "M0" as a destination MAC address is transmitted from the server 202-3 to the server 202-2 via a communication path illustrated in a heavy solid line.

Next, in step S408, the management device 208 transmits information of the virtual MAC address "M0" assigned in step S404 and the MAC address "A0" assigned to the VM 212-1 to be moved to the server (transmission source server) 202-3 belonging to the transmission source VM 212-4 corresponding to the VM 212-1 to be moved, via the network line for management.

The management device 208 further instructs the transmission source server 202-3 to set MAC address conversion processing based on the virtual MAC address "M0" via the network line for management. The transmission source server 202-3 sets the MAC address conversion processing based on the virtual MAC address "M0" in the internal address conversion unit 226 based on the instructions from the management device 208. For example, the address conversion unit 226 generates an address conversion table, and when the virtual switch 214-3 receives traffic data addressed to the VM 212-1 to be moved from the corresponding VMs 212-4 and 212-5, converts the destination MAC address "A0" into the virtual MAC address "M0" in the received traffic data, based on the generated address conversion table.

With the example illustrated in FIG. 3, the address conversion unit 226 converts, with traffic data addressed to the VM 212-1 from the VM 212-4, a combination between the MAC address "A1" indicating the transmission source VM (transmission source MAC address) and the destination MAC address "A0" into a combination between the transmission source MAC address "A1" and the destination MAC address "M0".

Note that, in this step, the address conversion unit 226 has not been activated, and the set MAC address conversion processing is not executed on the traffic data received from the VM 212-4.

Next, in step S410, the management device 208 instructs the movement destination server 202-2 to set the MAC address conversion processing based on the virtual MAC address "M0", via the network line for management. The movement destination server 202-2 sets the MAC address conversion processing based on the virtual MAC address "M0" in the internal address conversion unit 224 based on the instructions from the management device 208. For example, the address conversion unit 224 generates an address conversion table, and when the virtual switch 214-2 receives traffic data from the corresponding switch device 204-2, converts the destination MAC address "M0" assigned to the virtual switch 214-2 into the MAC address "A0" of the VM 212-1 which is the original destination, in the received traffic data, based on the generated address conversion table.

With the example illustrated in FIG. 3, the address conversion unit 224 converts, with traffic data addressed to the VM 212-1 from the VM 212-4, a combination between the transmission source MAC address "A1" and the destination MAC address "M0" into a combination between the transmission source MAC address "A1" and the destination MAC address "A0".

Further, the management device 208 instructs the movement destination server 202-2 to activate the address conversion unit 224 included in the corresponding virtual switch 214-2 via the network line for management.

The movement destination server 202-2 activates the internally provided address conversion unit 224 based on the instructions from the management device 208. Thus, with the virtual switch 214-2, the above-mentioned set MAC address conversion processing is activated, and the above-mentioned MAC address conversion processing will be executed on the traffic data to be received from the corresponding switch device 204-2.

Next, in step S412, the management device 208 instructs the movement source server 202-1 to move the VM 212-1 decided to be moved in step S402 from the server 202-1 to the server 202-2 using live migration.

Next, in step S414, the movement source server 202-1 executes well-recognized live migration on the VM 212-1 to be moved, based on the instructions from the management device 208, thereby moving the VM 212-1 to be moved from the server 202-1 to the server 202-2. With live migration, for example, the movement source server 202-1 transfers various types of setting information regarding the VM 212-1 to the movement destination server 202-2 via the network line for management.

Next, in step S416, the movement source server 202-1 transmits, when movement of the VM 212-1 to be moved according to live migration is completed, a movement completion notification of the VM 212-1 to the management device 208 via the network line for management. The movement source 202-1 transmits, when transfer of various types of setting information regarding the VM 212-1 to be moved toward the movement destination server 202-2 is normally completed, a movement completion notification of the VM 212-1 to the management device 208, for example.

Next, in step S418, the management device 208 instructs, when receiving a movement completion notification of the VM 212-1 from the movement source server 202-1, the transmission source server 202-3 corresponding to the VM 212-1 to be moved to activate the address conversion unit 226 included in the corresponding virtual switch 214-3.

The transmission source server 202-3 activates the internally provided address conversion unit 226 based on the instructions from the management device 208. Thus, with the virtual switch 214-3, the MAC address conversion processing set in step S408 is activated, and the above-mentioned MAC address conversion processing will be executed on the traffic data to be received from the corresponding VM 212-4.

According to the processing from step S402 to step S418 described above, with the example illustrated in FIG. 3, at the instant of movement of the VM 212-1 toward the movement destination server 202-2 being completed, a temporary communication path via the address conversion unit 224 and address conversion unit 226 has already been established between the transmission source VM 212-4 and the destination VM 212-1 as illustrated in a heavy solid line.

Thus, with between the transmission source VM 212-4 and the destination VM 212-1, even in the event that movement of a VM occurs during execution of communication, at the instant of movement of the VM 212-1 being completed, the communication path may be switched to the already established temporary communication path, and accordingly, communication between the transmission source VM 212-4 and the destination VM 212-1 may be continued without interrupting the communication.

Also, with the communication paths illustrated in a heavy solid line in FIG. 3, a portion between the address conversion unit 224 and address conversion unit 226 of the established communication paths is a communication path established as to the virtual switch 214-2 having the virtual MAC address "M0" assigned by the management device 208.

With switching of a communication path, according to a temporary communication path established for the virtual switch 214-2 having the virtual MAC address "M0" being used, even in the event that movement of the destination VM 212-1 occurs during execution of communication, at the instant of movement of the VM 212-1 being completed, the communication path is immediately able to be switched to the communication path temporarily established with the virtual MAC address "M0", and accordingly, communication between the transmission source VM 212-4 and the destination VM 212-1 may be continued without interrupting the communication.

According to the MAC address conversion processing according to the address conversion units 224 and 226, the transmission source VM 212-4 and destination VM 212-1 do not have to consider the information of the virtual MAC address "M0" at all at the time of performing communication, and accordingly, communication may be performed without changing the contents of traffic data before and after movement of the VM. Thus, communication between the transmission source VM 212-4 and the destination VM 212-1 may be continued without interrupting the communication.

1-2-2. Retrieval of Virtual MAC Address After Movement of VM

Description will be made regarding a communication control method to be performed at the data center network system 200 after a VM is moved by live migration, with reference to FIGS. 5 and 6.

Figure 5:
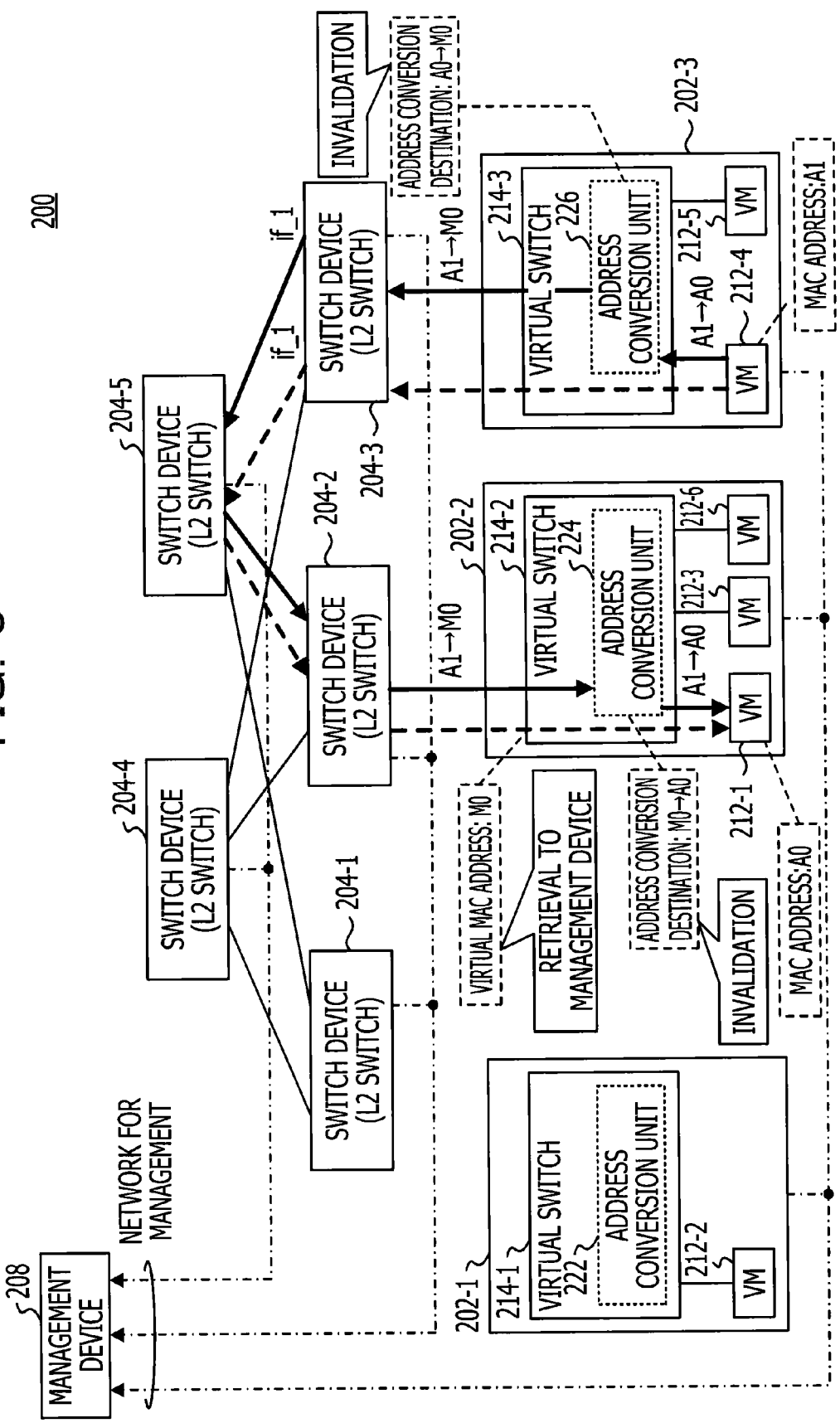
FIG. 5 is a system configuration diagram for describing virtual MAC address retrieval processing to be executed before and after movement of a VM.

FIG. 5 is a system configuration diagram for describing virtual MAC address retrieval processing to be executed after movement of a VM. FIG. 6 is a sequence chart illustrating the virtual MAC address retrieval processing to be executed after movement of a VM.

First, description will be made regarding the state of the data center network system 200 after movement of a VM is completed.

With the example illustrated in FIG. 5, after movement of a VM, as illustrated in a heavy solid line, a communication path is established between the VM 212-1 which has belonged to the server 202-2 according to movement by live migration and the VM 212-4 belonging to the server 202-3, and communication from the VM 212-4 to the VM 212-1 is being performed. The state illustrated in FIG. 5 corresponds to the state of the data center network system 200 after the processing in step S418 in FIG. 4 is completed.

With the stage after movement of a VM, with the servers 202-2 and 202-3 to which the transmission source VM 212-4 and the destination VM 212-1 belong respectively, the corresponding address conversion units 224 and 226 have been activated, and the above-mentioned MAC address conversion processing has been executed at the corresponding address conversion units 224 and 226. For example, with between the transmission source VM 212-4 and the destination VM 212-1, a communication path has been established via the address conversion units 224 and 226, and of the established communication path, a portion between the address conversion units 224 and 226 is a communication path established for the virtual switch 214-2 having the virtual MAC address "M0".

Figure 6:
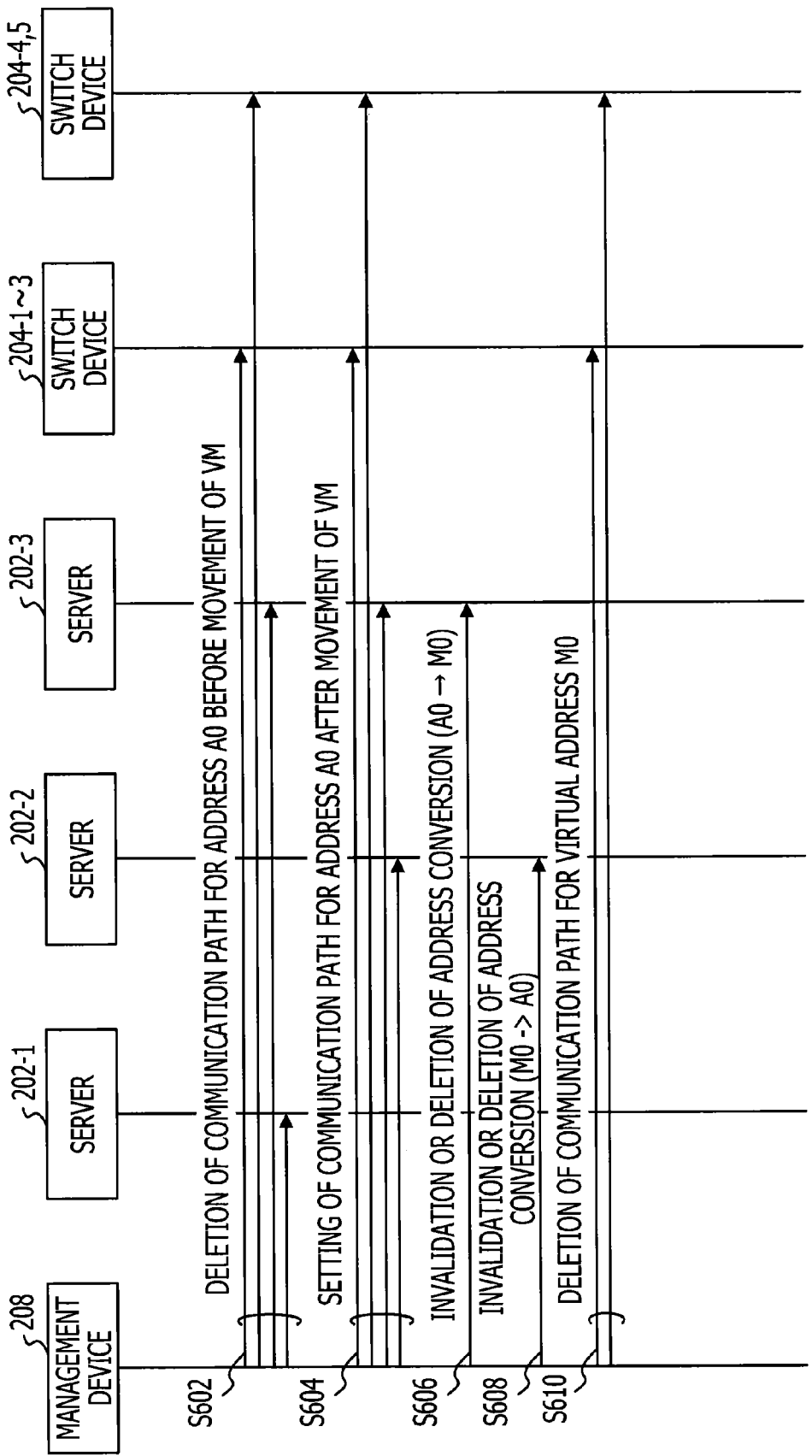
FIG. 6 is a sequence chart illustrating the virtual MAC address retrieval processing to be executed before and after movement of a VM.

Under the above-mentioned state, as illustrated in FIG. 6, in step S602, the management device 208 instructs the switch devices 204-1 to 204-5 and servers 202-1 and 202-3 included in the data center network system 200 to delete the communication path set before movement as to the MAC address "A0" of the moved VM 212-1 via the network line for management.

Each of the switch devices 204-1 to 204-5 and servers 202-1 and 202-3 updates the internal forwarding information table based on the instructions from the management device 208. For example, each of the switch devices 204-1 to 204-5 and servers 201-2 and 202-3 deletes information indicating a correspondence relation between the MAC address "A0" of the moved VM 212-1 and the output interface corresponding to the MAC address "A0" thereof, from the internal forwarding information table.

Note that, with the example illustrated in FIG. 5, deletion instructions of the above-mentioned communication path are not performed on the server 202-2 which is the movement destination server of the VM 212-1, but deletion instructions of the communication path may be performed in the same way as with the other servers 202-1 and 202-3.

Next, in step S604, the management device 208 transmits an instruction message to instruct each of the switch devices 204-1 to 204-5 and servers 202-2 and 202-3 to set a new communication path as to the MAC address "A0" of the moved VM 212-1 via the network line for management. The virtual MAC address "M0" and also information of the corresponding output interface are included in the instruction message from the management device 208.

Each of the switch devices 204-1 to 204-5 and servers 202-2 and 202-3 receives the instruction message to instruct to set a communication path as to the MAC address "A0" of the moved VM 212-1 from the management device 208 via the network line for management. Each of the switch devices 204-1 to 204-5 and servers 202-2 and 202-3 adds information indicating a correspondence relation between the MAC address "A0" and the output interface corresponding to the MAC address "A0" in the internal forwarding information table based on the received instruction message.

For example, as illustrated in FIG. 5, the switch device 204-3 correlates the MAC address "A0" of the destination VM 212-1 with an interface if_1 as the corresponding output interface in the internal forwarding information table. Details of the forwarding information table will be described later.

Upon updating of the forwarding information table at each of the switch devices 204-1 to 204-5 and server 202-3 being completed, with the example illustrated in FIG. 5, a communication path as to the moved VM 212-1 having the MAC address "A0" is established, as illustrated in a heavy dashed line, between the switch devices 204-2, 204-3, and 204-5, virtual switches 214-2 and 214-3, and the VMs 212-1 and 212-4. That is to say, traffic data having the MAC address "A0" of the moved VM 212-1 will be transmitted from the server 202-3 to the server 202-2 via the communication path illustrated in a heavy dashed line.

Note that, with the example illustrated in FIG. 5, the above-mentioned communication path setting instructions are not performed on the server 202-1 which is the movement source server of the VM 212-1, but the communication path setting instructions may be performed in the same way as with the other server 202-3.

Next, in step S606, the management device 208 instructs the server 202-3 to which the transmission source VM 212-4 belongs to inactivate the corresponding address conversion unit 226.

The transmission source server 202-3 inactivates the internally provided address conversion unit 226 based on the instructions from the management device 208. Thus, with the virtual switch 214-3, the MAC address conversion processing set in step S408 in FIG. 4 is invalidated, and the above-mentioned MAC address conversion processing will not be executed on traffic data to be received from the corresponding VM 212-4.

Note that, with the virtual switch 214-3, the address conversion table to be used at the time of performing the MAC address conversion processing may be deleted instead of invalidating the MAC address conversion processing.

Next, in step S608, the management device 208 instructs the server 202-2 to which the moved VM 212-1 belongs to inactivate the corresponding address conversion unit 224.

The movement destination server 202-2 inactivates the internally provided address conversion unit 224 based on the instructions from the management device 208. Thus, with the virtual switch 214-2, the MAC address conversion processing set in step S410 in FIG. 4 is invalidated, and the above-mentioned MAC address conversion processing will not be executed on traffic data to be received from the corresponding switch device 204-2.

Note that, with the virtual switch 214-2, the address conversion table to be used at the time of performing the MAC address conversion processing may be deleted instead of invalidating the MAC address conversion processing.

Next, in step S610, the management device 208 instructs each of the switch devices 204-1 to 204-5 to delete the communication path set before movement as to the virtual MAC address "M0" assigned to the virtual switch 214-2 via the network line for management.

Each of the switch devices 204-1 to 204-5 updates the internal forwarding information table based on the instructions from the management device 208. For example, each of the switch devices 204-1 to 204-5 deletes information indicating a correspondence relation between the virtual MAC address "M0" and the output interface corresponding to the virtual MAC address "M0" from the internal forwarding information table.

Upon updating of the forwarding information table at each of the switch devices 204-1 to 204-5 being completed, with the example illustrated in FIG. 5, a communication path as to the virtual switch 214-2 having the virtual MAC address "M0" illustrated in a heavy solid line, between the switch devices 204-2, 204-3, and 204-5, and virtual switches 214-2 and 214-3, is deleted.

According to the processing from step S602 to step S610 described above, with the example illustrated in FIG. 5, after movement of the VM 212-1 toward the movement destination server 202-2 is completed, in a state in which the communication path passing through the address conversion units 224 and 226 illustrated in a heavy solid line has been established between the transmission source VM 212-4 and the destination VM 212-1, a communication path not passing through the address conversion unit 224 and 226 is newly established as illustrated in a heavy dashed line.

In a state in which the communication path not passing through the address conversion unit 224 and 226 illustrated in a heavy dashed line has been established between the transmission source VM 212-4 and the destination VM 212-1, the communication path passing through the address conversion units 224 and 226 illustrated in a heavy solid line is deleted. Thus, the communication path from the transmission source VM 212-4 to the destination VM 212-1 is switched from the temporary communication path set with the virtual MAC address "M0" (communication path illustrated in a solid line) to the original communication path (communication path illustrated in a dashed line) as to the moved VM 212-1.

Accordingly, without interrupting communication from the transmission source VM 212-4 to the destination VM 212-1, the communication path thereof may be switched from a temporary communication path to a newly established communication path according to the position after movement of the VM.

Also, after the original communication path (communication path illustrated in a dashed line) as to the moved VM 212-1 is established, the temporary communication path (communication path illustrated in a solid line) set with the virtual MAC address "M0" is deleted, whereby the management device 208 may retrieve the virtual MAC address "M0" assigned to the movement destination server 202-2.

Accordingly, thereafter, even in the event that movement according to live migration regarding another VM has occurred, the management device 208 may assign the same address "M0" to this VM as a virtual MAC address. Thus, with the management device 208, increase in the number of MAC addresses that the management device 208 manages due to assignment of a virtual MAC address at the time of movement of a VM occurring may be suppressed.

1-3. Configuration of Server 202

1-3-1. Internal Configuration of Server 202

Figure 7:
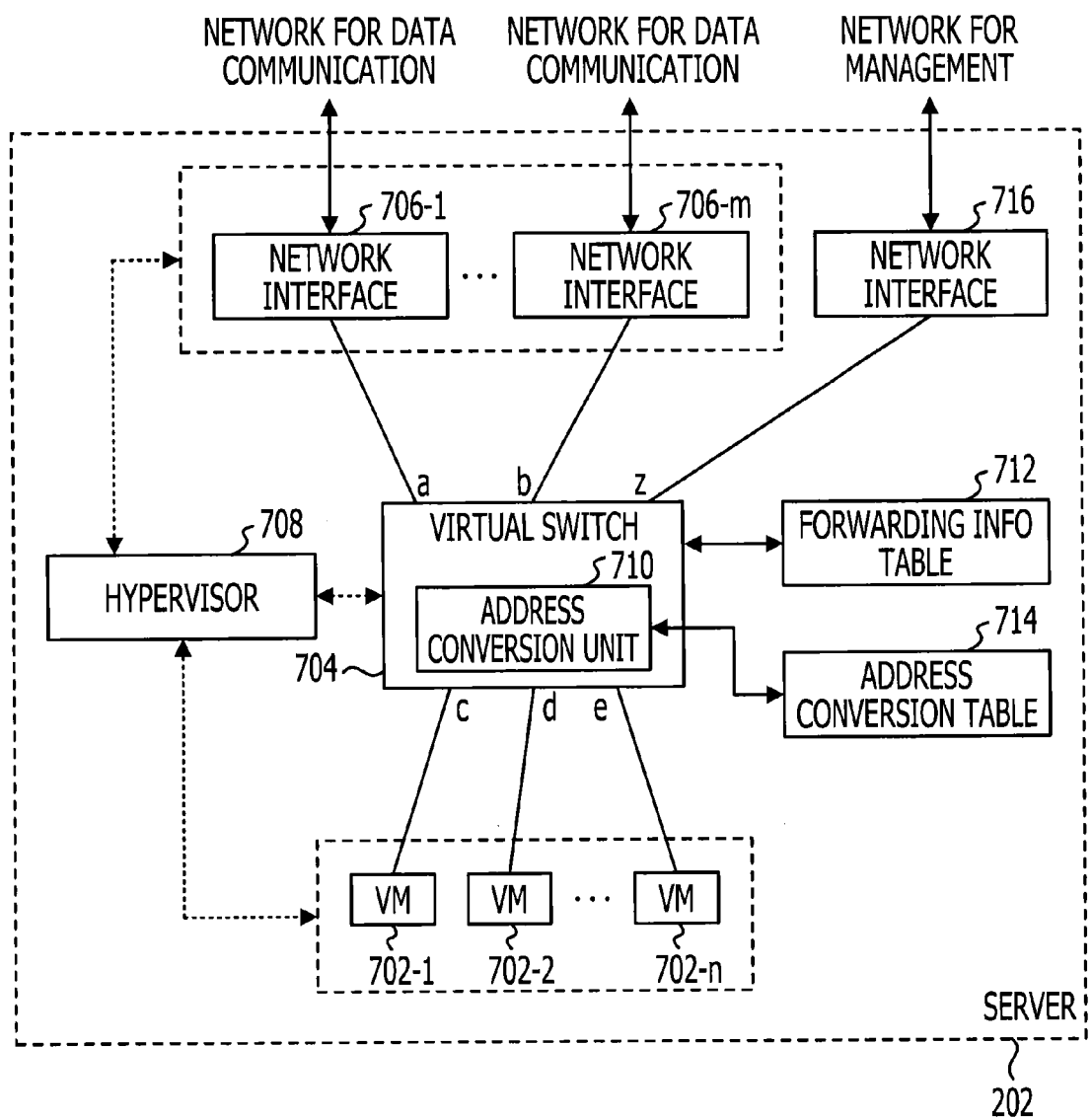
FIG. 7 is a function block diagram illustrating an internal configuration of a server according to the first embodiment.

FIG. 7 is a function block diagram illustrating an internal configuration of the servers 202 (202-1 to 202-3) according to the first embodiment. FIG. 8 is a diagram indicating an example of a forwarding information table 712. FIGS. 9A and 9B are diagrams indicating an example of an address conversion table 714.

As illustrated in FIG. 7, the servers 202 included in the data center network system 200 include VMs 702-1 to 702-*n*, a virtual switch 704, network interfaces 706-1 to 706-*m*, a hypervisor 708, an address conversion unit 710, a forwarding information table 712, an address conversion table 714 and a network interface 716.

The hypervisor 708 performs the entire management and operation control of the servers 202. The hypervisor 708 controls operations of the VM 702-1 to 702-*n*, virtual switch 704, and network interfaces 706-1 to 706-*m*, and 716. The hypervisor 708 assigns the corresponding one virtual interface out of multiple virtual interfaces (virtual interfaces a to e, z, etc.) to each of the VM 702-1 to 702-*n* and network interfaces 706-1 to 706-*m*, and 716 with the virtual switch 704.

The VM 702-1 to 702-*n* (n is a positive integer) are virtual machines provided to the servers 202, and are software to emulate the operation of the computer. The VMs 702-1 to 702-*n* output traffic data generated at the own device to the virtual switch 704, and also receives traffic data generated at a VM provided to another server from the virtual switch 704. With the example illustrated in FIG. 7, the VMs 702-1, 702-2 and 702-*n* are coupled to virtual interfaces c, d, and e of the virtual switch 704, respectively.

The network interfaces 706-1 to 706-*m* (m is a positive integer) are transmission/reception interfaces provided to the servers 202. The network interfaces 706-1 to 706-*m* perform, with the data center network system 200 illustrated FIG. 2, transmission/reception of traffic data with another switch device or server via a network line for data communication. With the example illustrated in FIG. 7, the network interfaces 706-1 and 706-*m* are coupled to virtual interfaces a and b of the virtual switch 704, respectively.

Also, the network interface 716 is a transmission/reception interface provided to the severs 202. The network interface 716 performs transmission/reception of management information with the management device 208 via the network line for management, with the data center network system 200 illustrated in FIG. 2. With the example illustrated in FIG. 7, the network interface 716 is coupled to a virtual interface z of the virtual switch 704.

The virtual switch 704 includes multiple virtual interfaces such as the virtual interfaces a to e and z, and so forth. The virtual switch 704 receives traffic data from the VMs 702-1 to 702-*m* and network interfaces 706-1 to 706-*m* via the multiple virtual interfaces (virtual interfaces a to e, etc.). The virtual switch 704 controls communication between the VMs 702-1 to 702-*n* and the network interfaces 706-1 to 706-*m* regarding the received traffic data. The virtual switch 704 corresponds to the virtual switches 214-1 to 214-3 illustrated in FIGS. 3 and 5.

The virtual switch 704 performs switching control with reference to the forwarding information table 712 when receiving traffic data from the VMs 702-1 to 702-*n*. As indicated in FIG. 8, the forwarding information table 712 stores information indicating a correspondence relation between a MAC address indicating a destination of traffic data (destination MAC address) and a virtual interface of the virtual switch 704 serving as an output interface of the traffic data.

The virtual switch 704 decides a virtual interface to output the received traffic data out of the multiple virtual interfaces with reference to the forwarding information table 712 based on a destination MAC address included in the received traffic data. The virtual switch 704 outputs the received traffic data to the corresponding network interface out of the multiple network interfaces 706-1 to 706-*m* via the decided virtual interface (output interface).

Note that, in the event that the address conversion unit 710 has been activated, and the MAC address conversion processing using the address conversion unit 710 has been enabled, the virtual switch 704 decides the output interface based on the destination MAC address after address conversion processing using the address conversion unit 710.

Also, the virtual switch 704 receives various types of information transmitted from the management device 208 from the network interface 716 via the virtual interface (virtual interface z, etc.). The virtual switch 704 generates, when receiving information of a virtual MAC address assigned to the movement destination server of the VM to be moved, an address conversion table 714 to be used for address conversion processing to be executed at the internally provided address conversion unit 710. The address conversion unit 710 corresponds to the address conversion units 222, 224, and 226 illustrated in FIGS. 3 and 5.

The virtual switch 704 activates the address conversion unit 710 when receiving instructions from the management device 208 to instruct to activate the corresponding address conversion unit. The activated address conversion unit 710 performs conversion processing of a destination MAC address included in the traffic data received by the corresponding virtual switch 704 with reference to the generated address conversion table.

As indicated in FIG. 9A, when the virtual switch 704 is included in a server (transmission source server) to which the transmission source VM corresponding to the VM to be moved (destination VM) belongs, with the address conversion table 714, the virtual switch 704 sets the MAC address assigned to the VM to be moved as a destination MAC address before address conversion, and sets the virtual MAC address received from the management device 208 as a destination MAC address after address conversion.

With the virtual switch 704 included in the transmission source server, the address conversion unit 710 converts a destination MAC address included the traffic data received by the corresponding virtual switch 704 from a MAC address assigned to the VM to be moved (destination VM) to a virtual MAC address with reference to the address conversion table 714 indicated in FIG. 9A.

On the other hand, as indicated in FIG. 9B, when the virtual switch 704 is included in the movement destination server of the VM to be moved (destination VM), with the address conversion table 714, the virtual switch 704 sets the virtual MAC address received from the management device 208 as a destination MAC address before address conversion, and sets the MAC address assigned to the VM to be moved as a destination MAC address after address conversion.

With the virtual switch 704 included in the movement destination server, the address conversion unit 710 converts a destination MAC address included the traffic data received by the corresponding virtual switch 704 from a virtual MAC address to the MAC address assigned to the VM to be moved (destination VM) with reference to the address conversion table 714 indicated in FIG. 9B.

According to the MAC address conversion processing using the address conversion unit 710, the VMs 702-1 to 702-n do not have to consider the information of a virtual MAC address at all at the time of performing communication, and accordingly, communication may be performed without changing the contents of traffic data before and after movement according to live migration. Thus, communication between the VMs may be continued without interrupting the communication.

1-3-2. Hardware Configuration of Servers 202

Figure 10:
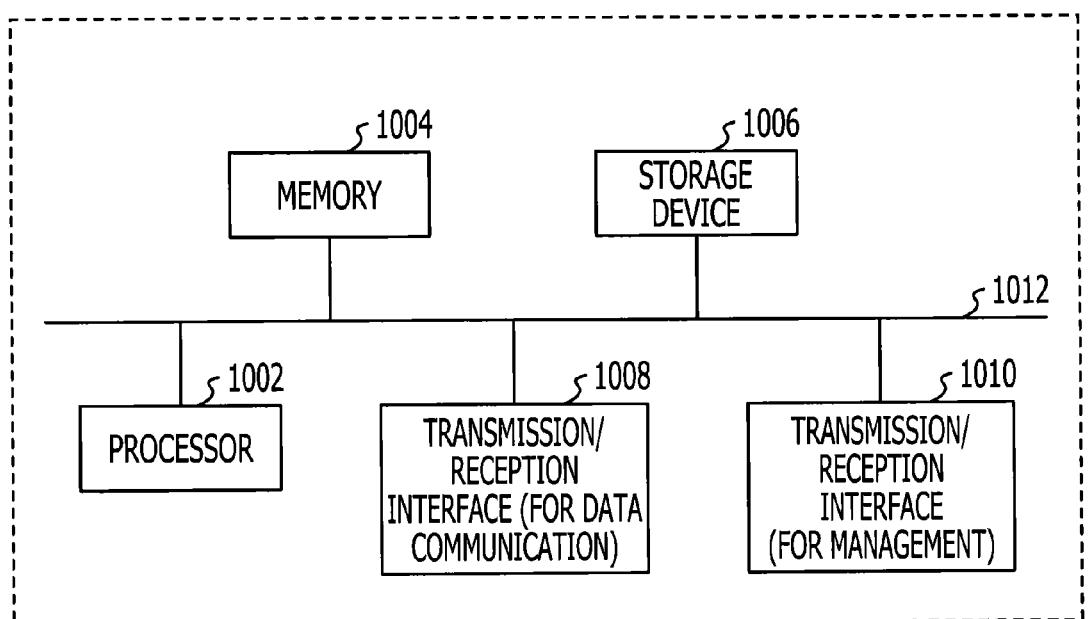
FIG. 10 is a hardware configuration diagram illustrating an internal configuration of the server.

FIG. 10 is a hardware configuration diagram illustrating an internal configuration of the servers 202.

As illustrated in FIG. 10, the servers 202 include a processor 1002, memory 1004, a storage device 1006, a transmission/reception interface 1008 for data communication, a transmission/reception interface 1010 for management, and a bus 1012. The processor 1002, memory 1004, storage unit 1006, and transmission/reception interfaces 1008 and 1010 are each coupled to a bus 1012.

The function of each function block of the servers 202 illustrated in FIG. 7 may be realized with the hardware configuration illustrated in FIG. 10. Here, the memory 1004 is RAM, for example. The storage device 1006 is nonvolatile memory such as ROM, flash memory, or the like, or a magnetic disk device such as an HDD (Hard Disk Drive) or the like, for example.

The function and processing of the VMs 702-1 to 702-n, virtual switch 704, hypervisor 708, and address conversion unit 710 illustrated in FIG. 7 may be realized by the processor 1002 executing a processing program in which the corresponding function and processing is described.

The above-mentioned processing program is stored in the storage device 1006, the processor 1002 loads a processing program stored in the storage device 1006 into the memory 1004, and executes the processes described in the processing program, thereby realizing the above-mentioned function blocks.

The forwarding information table 712 and address conversion table 714 illustrated in FIG. 7 are realized with the memory 1004 or storage device 1006. The processor 1002 performs desired access to the memory 1004 or storage device 1006 based on the processes described in the above-mentioned processing program, and accordingly, data as to the corresponding storage area is referenced.

The function and processing of the network interfaces 706-1 to 706-m, and 716 illustrated in FIG. 7 may be realized by the processor 1002 executing a processing program in which the corresponding function and processing are described, and further controlling the transmission/reception interfaces 1008 and 1010 that are able to be coupled to the network line for data communication and the network line for management. The transmission/reception interfaces 1008 and 1010 are well-recognized I/O (Input/Output) interface circuits, for example.

Note that the above-mentioned function blocks illustrated in FIG. 7 may be realized with an LSI such as an ASIC (Application Specific Integrated Circuit), FPGA (Field Programmable Gate Array), or the like, in addition to the hardware configuration illustrated in FIG. 10.

1-4. Configuration of Switch Device 204

Figure 11:
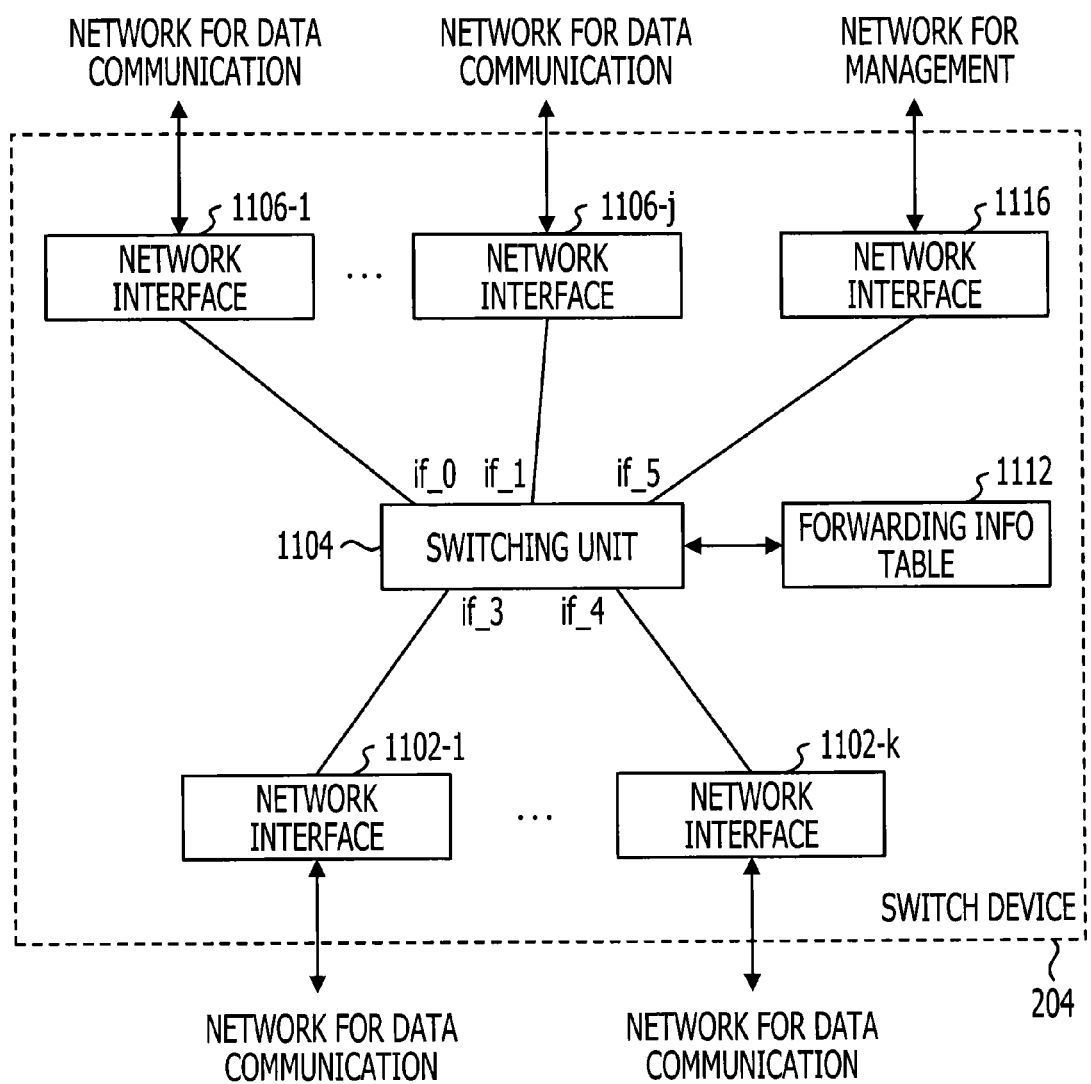
FIG. 11 is a function block diagram illustrating an internal configuration of a switch device according to the first embodiment.

FIG. 11 is a function block diagram illustrating an internal configuration of the switch devices 204 (204-1 to 204-5) according to the first embodiment. FIGS. 12A and 12B are diagrams indicating an example of a forwarding information table 1112.

As illustrated in FIG. 11, the switch devices 204 included in the data center network system 200 include network interfaces 1102-1 to 1102-k, 1106-1 to 1106-j, and 1116, a switching unit 1104, and a forwarding information table 1112.

The network interfaces 1102-1 to 1102-k, and 1106-1 to 1106-j (k and j are positive integers) are transmission/reception interfaces provided to the switch devices 204. The network interfaces 1102-1 to 1102-k, and 1106-1 to 1106-j perform, with the data center network system 200 illustrated FIG. 2, transmission/reception of traffic data with another switch device or server via a network line for data communication. With the example illustrated in FIG. 11, the network interfaces 1102-1 and 1102-k are coupled to interfaces if_3 and if_4 of the switching unit 1104 respectively, and the network interfaces 1106-1 and 1106-j are coupled to interfaces if_1 and if_2 of the switching unit 1104 respectively.

The network interface 1116 is a transmission/reception interface provided to the switch devices 204. The network interface 1116 performs, with the data center network system 200 illustrated FIG. 2, transmission/reception of management information with the management device 208 via the network line for management. With the example illustrated in FIG. 11, the network interface 1116 is coupled to an interface if_5 of the switching unit 1104.

The switching unit 1104 includes multiple interfaces such as the interfaces if_0 to if_5, and so forth. The switching unit 1104 receives traffic data from the network interfaces 1102-1 to 1102-k and 1106-1 to 1106-j via the multiple virtual interfaces. The switching unit 1104 controls communication between the network interfaces 1102-1 to 1102-k and 1106-1 to 1106-j regarding the received traffic data.

The switching unit 1104 performs switching control with reference to the forwarding information table 1112 when receiving traffic data from the network interfaces 1102-1 to 1102-k and 1106-1 to 1106-j. As indicated in FIGS. 12A and 12B, the forwarding information table 1112 stores information indicating a correspondence relation between a MAC address indicating a destination of traffic data (destination MAC address) and an interface of the switching unit 1104 serving as an output interface of the traffic data.

Note that the forwarding information table 1112 indicated in FIG. 12A indicates a state after communication path setting as to the virtual MAC address "M0" assigned to the movement destination server 202-2 was performed in step S406 in FIG. 4. The forwarding information table 1112 indicated in FIG. 12B indicates a state after communication path setting as to the MAC address "A0" assigned to the moved VM 212-1 was performed in step S604 in FIG. 6. Details will be described later.

The switching unit 1104 decides an interface to output the received traffic data out of the multiple interfaces with reference to the forwarding information table 1112. The switching unit 1104 outputs the received traffic data to the corresponding network interface out of the multiple network interfaces 1102-1 to 1102-k and 1106-1 to 1106-j via the decided interface (output interface).

Also, the switching unit 1104 receives various types of information transmitted from the management device 208 from the network interface 1116 via the interface (interface if_5 or the like).

The switching unit 1104 updates, when receiving an instruction message to instruct to set a communication path for the virtual MAC address assigned to the movement destination server of the VM to be moved, from the management device 208 via the network line for management, the forwarding information table 1112 within the switch devices 204 based on the received instruction message. The instruction message from the management device 208 includes information of the virtual MAC address and also the corresponding output interface.

With the example indicated in FIG. 12A, the forwarding information table 1112 stores, as an entry indicated with identification information "1", information correlating the MAC address "A0" of the VM to be moved with the interface if_0 as an output interface for the MAC address "A0". The entry of the identification information "1" is information corresponding to the communication path before movement of the VM 212-1 to be moved (communication path illustrated in a heavy dashed-dotted line in FIG. 3).

Now, when receiving an instruction message to instruct to set a communication path for the virtual MAC address "M0" from the management device 208, the switching unit 1104 adds, as an entry indicated with identification information "2", information correlating the virtual MAC address "M0" with the interface if_1 as an interface corresponding to the virtual MAC address "M0" to the forwarding information table 1112. The entry of the identification information "2" is information corresponding to the communication path set for the virtual MAC address "M0" (communication path illustrated in a heavy solid line in FIG. 3).

On the other hand, the switching unit 1104 updates, when receiving an instruction message to instruct to set a communication path for the MAC address of the VM to be moved, from the management device 208 via the network line for management, the forwarding information table 1112 within the switch devices 204 based on the received instruction message. The instruction message from the management device 208 includes information of the MAC address of the moved VM and also the corresponding output interface.

With the example indicated in FIG. 12B, the forwarding information table 1112 stores, as an entry indicated with identification information "2", information correlating the virtual MAC address "M0" with the interface if_1 as an interface corresponding to the virtual MAC address "M0". The entry of the identification information "2" is information corresponding to the communication path set for the virtual MAC address "M0" (communication path illustrated in a heavy solid line in FIG. 5). Note that the entry of the identification information "1" in FIG. 12A has already been deleted based on the instructions from the management device 208.

Now, when receiving an instruction message to instruct to set a communication path for the MAC address "A0" of the moved VM 212-1 from the management device 208, the switching unit 1104 adds, as an entry indicated with identification information "3", information correlating the MAC address "A0" with the interface if_1 as an interface corresponding to the MAC address "A0" of the VM 212-1 to the forwarding information table 1112. The entry of the identification information "3" is information corresponding to the communication path before movement of the VM 212-1 to be moved (communication path illustrated in a heavy dashed line in FIG. 5).

Note that the hardware configuration of the switch devices 204 is similar to the hardware configuration of the servers 202 illustrated in FIG. 10. The function of each function block of the switch devices 204 may be realized with the same hardware configuration as with the hardware configuration of the servers 202 illustrated in FIG. 10. Accordingly, detailed description thereof will be omitted.

2. Second Embodiment

Hereafter, a network system and a communication control method according to a second embodiment will be described. The network system and communication control method according to the second embodiment are an application using the function of the address conversion unit 222/224/226 in the virtual switches 214-1/214-2/214-3 of the servers 202-1/202-2/202-3 described in the first embodiment.

With a data center network system, in general, when two servers perform communication via a network made up of multiple switch devices, though multiple communication paths are formed between the two servers thereof, the communication paths have unevenness in quality. The unevenness in quality of the communication paths is caused due to the bandwidth of a communication band assigned to a link line between adjacent switch devices. In general, a communication path made up of a link line having a wider communication band has high quality, and has few frequencies in occurrence of a phenomenon such as loss or retransmission of traffic data.

On the other hand, with a data center network system, in general, when two servers perform communication, communication priorities differ depending on the type an application program (hereafter, abbreviated as application) that executes communication at each server. This is because a grade such as the loss rate and the number of times of retransmissions regarding traffic data, to be permitted in communication, differs according to the type of an application to execute communication. For example, communication to be executed by a business application which executes desired business processing by multiple VMs belonging to a different server collaborating with each other has a higher priority than communication to be executed by a web application such as a web browser or the like.

As described above, with a data network system, in the event that multiple communications are performed between two servers, it is desirable that as a communication path to be used for the communications thereof, a communication path having quality according to the priorities of the communications thereof is selected, thereby performing communication having a higher priority using a communication path having higher quality.

2-1. Configuration of Data Center Network System 1300

Figure 13:
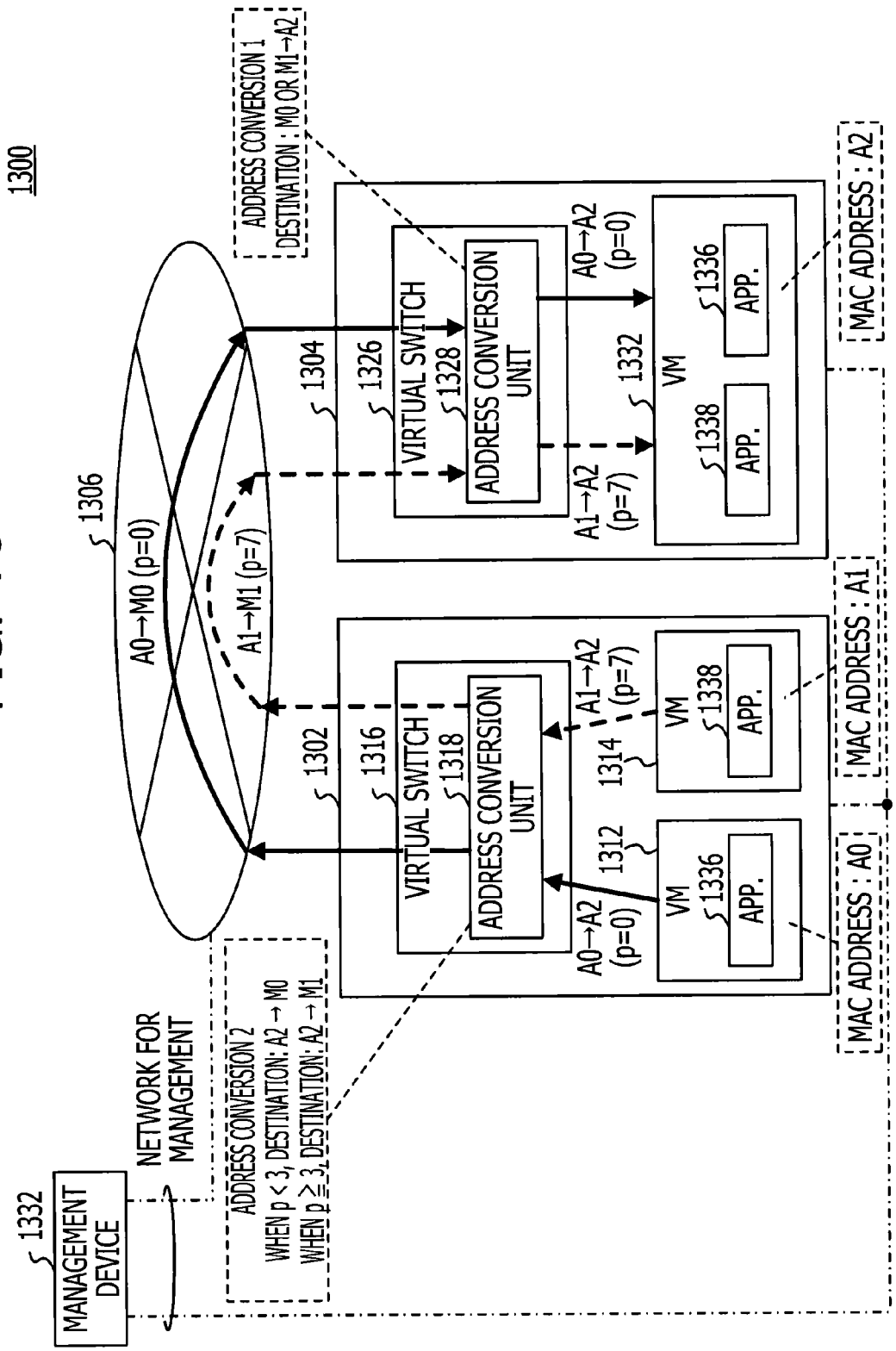
FIG. 13 is a system configuration diagram for describing communication control processing in a data center network system according to a second embodiment.

FIG. 13 is a system configuration diagram for describing communication control processing in a data center network system 1300 according to the second embodiment. First, a schematic configuration of the data center network system 1300 will be described with reference to FIG. 13.

As illustrated in FIG. 13, the data center network system 1300 according to the second embodiment includes servers 1302 and 1304, an L2 switch network 1306, and a management device 1332. The servers 1302 and 1304, and L2 switch network 1306 are coupled via a network line for data communication (not illustrated).

The L2 switch network 1306 is a network made up of multiple switch devices such as the switch devices 204-1 to 204-5 illustrated in FIG. 2. Multiple communication paths having different quality have been established on the L2 switch network 1306. For example, a communication path having relatively higher quality illustrated in a heavy solid line, and a communication path having relatively lower quality illustrated in a heavy dashed line have been established between the servers 1302 and 1304.

Virtual switches 1316 and 1326 included in the servers 1302 and 1304 respectively are virtually provided layer 2 (L2) switches similar to the virtual switches 214-1 to 214-3 illustrated in FIG. 2. The virtual switches 1316 and 1326 include address conversion units 1318 and 1328, respectively. As will be described later, each of the servers 1302 and 1304 receives information of multiple virtual MAC addresses corresponding to the multiple communication paths established on the L2 switch network 1306 from the management device 1332, and activate the corresponding address conversion unit 1318/1328. Each of the activated address conversion units 1318 and 1328 performs conversion processing of a MAC address included in the traffic data received by the corresponding virtual switch 1316/1326 based on the multiple virtual MAC addresses. The MAC address conversion processing will be described later.

The management device 1332 is coupled to the servers 1302 and 1304 and L2 switch network 1306 via a network line for management illustrated in a dashed-dotted line in FIG. 13. The management device 1332 monitors, in the same way as with the management device 208 illustrated in FIG. 2, between which VMs communication is being performed in the data center network system 1300 based on the received management information from the servers 1302/1304 via the network line for management. Also, the management device 1332 receives management information from the switch devices making up the L2 switch network 1306 via the network line for management, and monitors what kind of quality an established communication path has in the L2 switch network 1306 based on the received management information.

Further, the management device 1332 generates the above-mentioned multiple virtual MAC addresses, and informs the generated virtual MAC addresses to the servers 1302 and 1304 via the network line for management. The virtual MAC address is a MAC address to be temporarily assigned for specifying a communication path to be used for communication out of the multiple communication paths established on the L2 switch network 1306 at the servers 1302 and 1304.

2-2. Communication Control Method of Data Center Network System 1300

Figure 14:
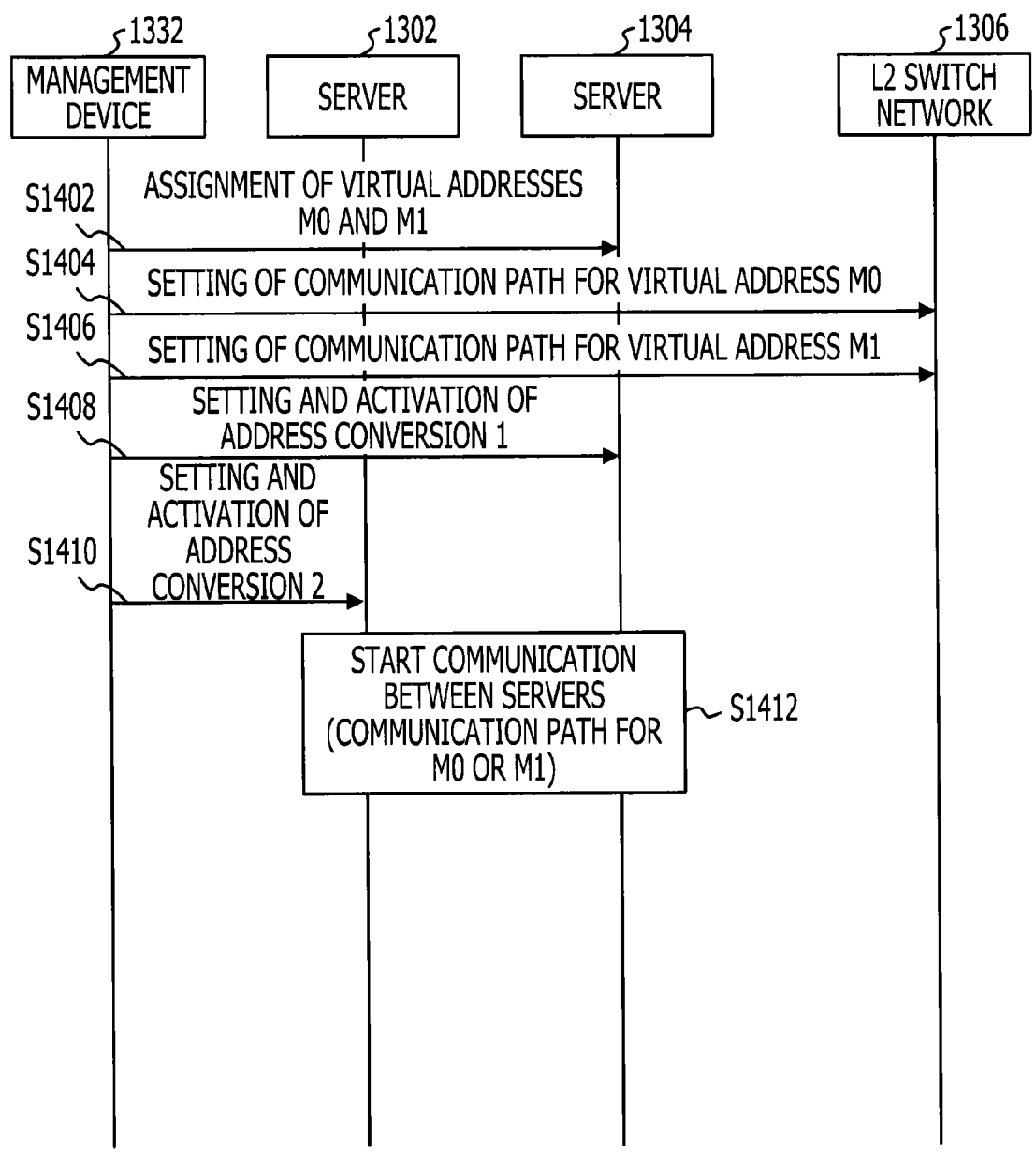
FIG. 14 is a sequence chart illustrating the communication control processing in the data center network system according to the second embodiment.

FIG. 14 is a sequence chart illustrating communication control processing in the data center network system 1300 according to the second embodiment. Next, a communication control method to be performed in the data center network system 1300 will be described with reference to FIGS. 13 and 14.

In FIG. 13, description will be made with a case where different two communications are executed by different applications 1336 and 1338 from two VMs 1312 and 1314 belonging to the server 1302 to one VM 1322 belonging to the sever 1304, as an example.

With the example illustrated in FIG. 13, communication from the VM 1312 having an address "A0" to the VM 1322 having an address "A2" is performed by the application 1336 to be executed in collaboration with the VMs 1312 and 1322, and communication from the VM 1314 having an address "A1" to the VM 1322 is performed by the application 1338 to be executed in collaboration with the VMs 1314 and 1322.

As illustrated in FIG. 14, in step S1402, the management device 1332 recognizes that communication from a VM belonging to the server 1302 to a VM belonging to the server 1304 is started, based on the management information from the servers 1302 and 1304. The management device 1332 assigns multiple virtual addresses to the server (destination server) 1304 to which the VM 1322 serving as a destination in the recognized communication belongs. The multiple virtual addresses to be assigned are to specify a communication path to be used for communication out of the multiple communication paths formed between the servers 1302 and 1304 on the L2 switch network 1306.

With the example illustrated in FIG. 13, the management device 1332 assigns two virtual MAC addresses "M0" and "M1" to the destination sever 1304. The virtual MAC address "M0" is to specify a communication path having relatively higher quality illustrated in a heavy solid line in the L2 switch network 1306. Traffic data having the virtual MAC address "M0" as a destination MAC address is transmitted from the server 1302 to the server 1304 via the communication path having relatively higher quality illustrated in a heavy solid line. On the other hand, the virtual MAC address "M1" is to specify a communication path having relatively lower quality illustrated in a heavy dashed line. Traffic data having the virtual MAC address "M1" as a destination MAC address is transmitted from the server 1302 to the server 1304 via the communication path having relatively lower quality illustrated in a heavy dashed line. The management device 1332 transmits information of the assigned virtual MAC addresses "M0" and "M1" to the destination server 1304 via the network line for management.

The destination server 1304 receives the information of the assigned multiple virtual MAC addresses "M0" and "M1" from the management device 1332. The destination server 1304 assigns the received virtual MAC addresses "M0" and "M1" to the internal virtual switch 1326.

Next, in step S1404, the management device 1332 transmits an instruction message to instruct to set the communication path to the virtual MAC addresses "M0" assigned to the virtual switch 1326 in step S1402 to the switch devices included in the L2 switch network 1306 via the network line for management. The instruction message from the management device 1332 includes information of the virtual MAC addresses "M0" and also the corresponding output interface.

Each of the switch devices included in the L2 switch network 1306 updates the forwarding information table regarding the virtual MAC addresses "M0" in a centralized manner based on the instruction message from the management device 1332. Each of the switch devices adds information indicating a correspondence relation between the virtual MAC addresses "M0" and the output interface corresponding to the virtual MAC addresses "M0" thereof, in the forwarding information table.

Upon updating of the forwarding information table being completed at each of the switch devices included in the L2 switch network 1306, with the example illustrated in FIG. 13, a communication path as to the virtual switch 1326 having the virtual MAC addresses "M0" is established in the L2 switch network 1306, as illustrated in a heavy solid line.

Next, in step S1406, the management device 1332 transmits an instruction message to instruct to set the communication path to the virtual MAC addresses "M1" assigned to the virtual switch 1326 in step S1402 to the switch devices included in the L2 switch network 1306 via the network line for management. The instruction message from the management device 1332 includes information of the virtual MAC addresses "M1" and also the corresponding output interface.

Each of the switch devices included in the L2 switch network 1306 updates the forwarding information table regarding the virtual MAC addresses "M1" in a centralized manner based on the instruction message from the management device 1332. Each of the switch devices adds information indicating a correspondence relation between the virtual MAC addresses "M1" and the output interface corresponding to the virtual MAC addresses "M1" thereof, in the forwarding information table.

Upon updating of the forwarding information table being completed at each of the switch devices included in the L2 switch network 1306, with the example illustrated in FIG. 13, a communication path as to the virtual switch 1326 having the virtual MAC addresses "M1" is established in the L2 switch network 1306, as illustrated in a heavy dashed line.

Next, in step S1408, the management device 1332 instructs the destination server 1304 to set MAC address conversion processing based on the virtual MAC addresses "M0" and "M1" via the network line for management. The destination server 1304 sets the MAC address conversion processing based on the virtual MAC addresses "M0" and "M1" in the internal address conversion unit 1328 based on the instructions from the management device 1332. For example, the address conversion unit 1328 generates an address conversion table, and in the event that the virtual switch 1326 has received traffic data from the L2 switch network 1306, converts the destination MAC addresses "M0" and "M1" in the received traffic data assigned to the virtual switch 1326 into the MAC address "A2" of the VM 1322 which is the original destination based on the generated address conversion table.

With the example illustrated in FIG. 13, the address conversion unit 1328 converts, with the traffic data addressed to the VM 1322 from the VM 1312, a combination between the MAC address of the VM serving as the transmission source (transmission source MAC address) "A0" and the destination MAC address "M0" into a combination between the transmission source MAC address "A0" and the destination MAC address "A2". Also, the address conversion unit 1328 converts, with the traffic data addressed to the VM 1332 from the VM 1314, a combination between the transmission source MAC address "A1" and the destination MAC address "M1" into a combination between the transmission source MAC address "A1" and the destination MAC address "A2".

Further, the management device 1332 instructs the destination server 1304 to activate the address conversion 1328 including the corresponding virtual switch 1326 via the network line for management.

The destination server 1304 activates the internally provided address conversion unit 1328 based on the instructions from the management device 1332. Thus, with the virtual switch 1326, the above-mentioned set MAC address conversion processing is activated, and the above-mentioned MAC address conversion processing will be executed on traffic data to be received from the L2 switch network 1306.

Next, in step S1410, the management device 1332 transmits information of the virtual MAC addresses "M0" and "M1" assigned in step S1402 and the MAC address "A2" of the destination VM 1322 to the server (transmission source server) 1302 to which the transmission source VMs 1312 and 1314 belong via the network line for management.

The management device 1332 further instructs the transmission source server 1302 to set MAC address conversion processing based on the virtual MAC addresses "M0" and "M1" via the network line for management. The transmission source server 1302 sets the MAC address conversion processing based on the virtual MAC addresses "M0" and "M1" in the internal address conversion unit 1318 based on the instructions from the management device 1332.

For example, the address conversion unit 1318 generates an address conversion table, and based on the generated address conversion table, when the virtual switch 1316 receives traffic data from the corresponding VMs 1312 and 1314, converts, with the traffic data thereof, the destination MAC address "A2" into one of the virtual MAC address "M0" or "M1" based on priority information added to the received traffic data. When priority information p added to the received traffic data has a value smaller than a given threshold p_th, the address conversion unit 1318 converts, with the traffic data thereof, the destination MAC address "A2" into the virtual MAC address "M0". When the value of the priority information p added to the received traffic data is equal to or greater than the threshold p_th, the address conversion unit 1318 converts, with the traffic data thereof, the destination MAC address "A2" into the virtual MAC address "M1".

The priority information is information indicating the priority of communication of traffic data, for example, and means that the smaller the value thereof is, the higher the priority thereof is. The priority information is determined beforehand according to the type of application to generate traffic data, and a higher priority is added to communication to be performed by a business application which executes desired business processing in collaboration with multiple VMs belonging to different servers, as compared to communication to be performed by a web application such as a web browser or the like. The priority information is added to each traffic data by an application to be executed at a VM at the time of generating traffic data.

With the example illustrated in FIG. 13, applications 1336 are being executed in a collaborated manner at the VMs 1312 and 1322, and the applications 1336 add the priority information p having a value "0" to traffic data addressed to the VM 1322 from the VM 1312 (p=0). On the other hand, applications 1338 are being executed in a collaborated manner at the VMs 1314 and 1322, and the applications 1338 add the priority information p having the value "7" to traffic data addressed to the VM 1322 from the VM 1314 (p=7). An example of the application 1336 is the above-mentioned business application, and an example of the application 1338 is the above-mentioned web application.

With the example illustrated in FIG. 13, the address conversion unit 1318 compares, with the traffic data addressed to the VM 1322 from the VM 1312, the value p of the added priority information and the threshold p_th of the priority information, and in response to the value p=0 of the priority information being smaller than the threshold p_th=3, converts a combination between the transmission source MAC address "A0" and the destination MAC address "A2" into a combination between the transmission source MAC address "A0" and the destination MAC address "M0".

On the other hand, the address conversion unit 1318 compares, with the traffic data addressed to the VM 1322 from the VM 1314, the value p of the added priority information and the threshold p_th of the priority information, and in response to the value p=7 of the priority information being greater than the threshold p_th=3, converts a combination between the transmission source MAC address "A1" and the destination MAC address "A2" into a combination between the transmission source MAC address "A1" and the destination MAC address "M1".

Further, the management device 1332 instructs the transmission source server 1302 to activate the address conversion unit 1318 included in the corresponding virtual switch 1316 via the network line for management.

The transmission source server 1302 activates the internally provided address conversion unit 1318 based on the instructions from the management device 1332. Thus, with the virtual switch 1316, the above-mentioned set MAC address conversion processing is enabled, and the above-mentioned MAC address conversion processing will be executed on traffic data to be transmitted to the L2 switch network 1306.

Next, in step S1412, the transmission source server 1302 and destination server 1304 start communication of traffic data. Here, the transmission source server 1302 and destination server 1304 applies the communication path specified by the virtual MAC address "M0" (communication path illustrated in a heavy solid line in FIG. 13) to communication from the VM 1312 to the VM 1322 that the application 1336 executes. On the other hand, the transmission source server 1302 and destination server 1304 applies the communication path specified by the virtual MAC address "M1" (communication path illustrated in a heavy dashed line in FIG. 13) to communication from the VM 1314 to the VM 1322 that the application 1338 executes.

According to the processing in steps S1402 to S1412 described above, with the example illustrated in FIG. 13, in the event that communication is performed between the servers 1302 and 1304 by the two applications 1336 and 1338 having a different priority, communication according to the application 1336 having a relatively higher communication property may be performed with a communication path having higher quality as compared to communication according to the application 1338 having a relatively lower communication property.

Accordingly, with the data center network system 1300, in the event that multiple communications are performed between two servers, a communication path having quality according to communication priority thereof may be selected as a communication path to be used for the communications thereof, and communication having a higher priority may be performed with a communication path having higher quality.

Note that, with the above-mentioned embodiment, though according to the management device 1332, two virtual MAC addresses have been assigned, and one threshold has been set for the priority information, an arrangement may be made wherein multiple thresholds are set for the priority information, and virtual MAC addresses to be assigned by the management device 1332 may be increased according to the number of the set thresholds.

3. Third Embodiment

Hereafter, a network system and a communication control method according to a third embodiment will be described. The network system and communication control method according to the third embodiment are an application using the function of the address conversion unit 222/224/226 in the virtual switches 214-1/214-2/214-3 of the servers 202-1/202-2/202-3 described in the first embodiment.

With a data center network system, in general, when two servers perform communication via a network made up of multiple switch devices, though a communication path passing through multiple switch devices is established between the two servers thereof, in the event that a failure has occurred in one of the multiple switch devices positioned on the communication path thereof, communication between the two servers is interrupted. In this case, an alternative communication path which avoids the switch device where the failure has occurred is established between the two servers, and communication between the two servers thereof is resumed using the established alternative communication path.

However, since the failure occurred in the switch device until an alternative communication path which avoids the switch device where the failure occurred is established, and the communication path between two servers is switched to the alternative communication path, communication between the two servers is interrupted.

Therefore, with a data center network system, it has been expected to rapidly switch, even in the event that a failure has occurred in a switch device on a communication path established between two servers, the communication path between the two servers to an alternative communication path.

3-1. Configuration of Data Center Network System 1500

Figure 15:
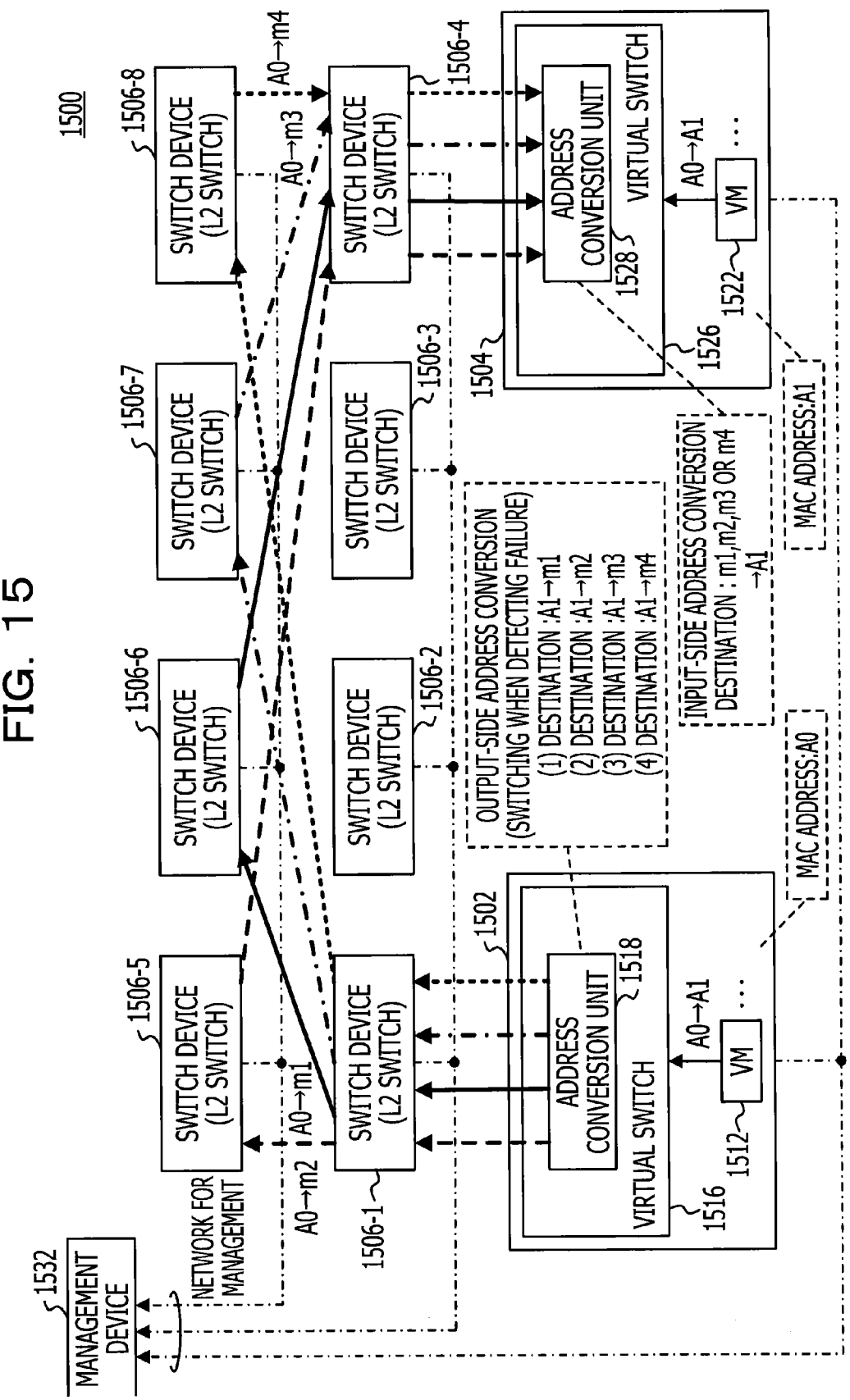
FIG. 15 is a system configuration diagram for describing communication control processing in a data center network system according to a third embodiment.

FIG. 15 is a system configuration diagram for describing communication control processing in a data center network system 1500 according to the third embodiment. First, a schematic configuration of the data center network system 1500 will be described with reference to FIG. 15.

As illustrated in FIG. 15, the data center network system 1500 according to the third embodiment includes servers 1502 and 1504, switch devices 1506-1 to 1506-8, and a management device 1532. The servers 1502 and 1504, and switch devices 1506-1 and 1506-4 are coupled via a network line for data communication (not illustrated).

The switch devices 1506-1 to 1506-8 are switch devices similar to the switch devices 204-1 to 204-5. The operation and function of the switch devices 1506-1 to 1506-8 are similar to the operation and function of the switch devices 204-1 to 204-5, and are as described in the first embodiment, and accordingly, description will be omitted.

Virtual switches 1516 and 1526 respectively included in the servers 1502 and 1504 are virtually provided layer 2 (L2) switches similar to the virtual switches 214-1 to 214-3 illustrated in FIG. 2. The virtual switches 1516 and 1526 include address conversion units 1518 and 1528, respectively. As will be described later, each of the servers 1502 and 1504 receives information of multiple virtual MAC addresses corresponding to multiple candidate paths to be used for communication from the management device 1532, and activates the corresponding address conversion unit 1518/1528. Each of the activated address conversion units 1518 and 1528 performs conversion processing of a MAC address included in the traffic data received by the corresponding virtual switch 1516/1526 based on the multiple virtual MAC addresses. The MAC address conversion processing will be described later.

The management device 1532 is coupled to the servers 1502 and 1504, and switch devices 1506-1 to 1506-8 via the network line for management illustrated in a dashed-dotted line in FIG. 15. The management device 1532 monitors, in the same way as with the management device 208 illustrated in FIG. 2, between which VMs communication is being performed in the data center network system 1500 based on management information received from the servers 1502 and 1504 via the network line for management. Also, the management device 1532 receives management information from the switch devices 1506-1 to 1506-8 via the network line for management, and based on the received management information, monitors what kind of communication path is formed via the switch devices 1506-1 to 1506-8, and also monitors the sates of the switch devices 1506-1 to 1506-8 (whether or not there is occurrence of a failure, etc.).

Further, the management device 1532 generates the above-mentioned multiple virtual MAC addresses, and informs the generated virtual MAC addresses to the servers 1502 and 1504 via the network line for management. The virtual MAC addresses are MAC addresses to be temporarily assigned to specify multiple candidate paths to be used for communication out of multiple communication paths passing through the switch devices 1506-1 to 1506-8 at the servers 1502 and 1504.

3-2. Communication Control Method of Data Center Network System 1500

FIG. 16 is a sequence chart illustrating communication control processing in the data center network system 1500 according to the third embodiment. Next, a communication control method to be performed in the data center network system 1500 will be described with reference to FIGS. 15 and 16.

In FIG. 15, description will be made with a case where communication is performed from the VM 1512 belonging to the server 1502 to the VM 1522 belonging to the server 1504, as an example.

With the example illustrated in FIG. 15, there are four candidate paths for communication from the VM 1512 having an address "A0" to the VM 1522 having an address "A1". All of the four candidate paths between the VMs 1502 and 1504 pass through the switch devices 1506-1 and 1506-4 in common, but differ regarding which switch device of the switch devices 1506-5 to 1506-8 the four candidate paths pass through. For example, the four candidate paths are a path 1 which passes through the switch device 1506-6 (communication path illustrated in a heavy solid line in FIG. 15), a path 2 which passes through the switch device 1506-5 (communication path illustrated in a heavy solid line in FIG. 15), a path 3 which passes through the switch device 1506-7 (communication path illustrated in a heavy dashed-dotted line in FIG. 15), and a path 4 which passes through the switch device 1506-8 (communication path illustrated in a heavy dotted line in FIG. 15). The candidate paths 1 to 4 are specified with virtual MAC addresses "m1" to "m4" to be assigned by the management device 1532, respectively. Traffic data having the virtual MAC address "m1" as a destination MAC address is transmitted from the server 1502 to the server 1504 via the communication path 1 illustrated in a heavy solid line. Similarly, traffic data having the virtual MAC address "m2"/"m3"/"m4" as a destination MAC address is transmitted from the server 1502 to the server 1504 via the communication path 2/3/4, respectively.

As illustrated in FIG. 16, in step S1602, the management device 1532 recognizes that communication from the VM 1512 belonging to the server 1502 to the VM 1522 belonging to the server 1504 is started, based on management information from the servers 1502 and 1504. The management device 1532 assigns multiple virtual MAC addresses to the server (destination server) 1504 to which the VM 1522 serving as a destination in the recognized communication belongs. The multiple virtual MAC addresses to be assigned to specify multiple candidate paths to be used for communication out of the multiple communication paths formed between the servers 1502 and 1504.

With the example illustrated in FIG. 15, the management device 1532 assigns the four virtual MAC addresses "m1" to "m4" to the destination server 1504. The virtual MAC addresses "m1" to "m4" are to specify the above-mentioned four communication paths 1 to 4. The management device 1532 transmits information of the assigned virtual MAC addresses "m1" to "m4" to the destination server 1504 via the network line for management.

The destination server 1504 receives the information of the assigned multiple virtual MAC addresses "m1" to "m4" from the management device 1532. The destination server 1504 assigns the received virtual MAC addresses "m1" to "m4" to the internal virtual switch 1526.

Next, in step S1604, the management device 1532 transmits an instruction message to instruct the switch devices 1506-1 to 1506-8 to set a communication path to each of the virtual MAC addresses "m1" to "m4" assigned to the virtual switch 1526 in step S1602, via the network line for management. The instruction message from the management device 1532 includes information of the virtual MAC addresses "m1" to "m4" and also output interfaces corresponding to these virtual MAC addresses.

The switch devices 1506-1 to 1506-8 update the forwarding information table regarding the virtual MAC addresses "m1" to "m4" in a centralized manner based on the instruction message from the management device 1532. The switch devices 1506-1 to 1506-8 add, with the forwarding information table, information indicating a correspondence relation between the virtual MAC addresses "m1" to "m4" and output interfaces corresponding to the virtual MAC addresses "m1" to "m4" thereof.

Upon updating of the forwarding information table being completed at the switch devices 1506-1 to 1506-8, with the example illustrated in FIG. 15, the above-mentioned four candidate paths specified with the virtual MAC addresses "m1" to "m4" are established.

Next, in step S1606, the management device 1532 instructs the destination server 1504 to set MAC address conversion processing based on the virtual MAC addresses "m1" to "m4", via the network line for management. The destination server 1504 sets the MAC address conversion processing based on the virtual MAC addresses "m1" to "m4" at the internal address conversion unit 1528, based on the instructions from the management device 1532.

For example, the address conversion unit 1528 generates an address conversion table, and in the event that the virtual switch 1526 has received traffic data from the corresponding switch device 1506-4, converts the virtual MAC addresses "m1" to "m4" assigned to the virtual switch 1526 into the MAC address "A1" of the VM 1522 which is the original destination in the received traffic data, based on the generated address conversion table.

With the example illustrated in FIG. 15, the address conversion unit 1528 converts, with traffic data addressed to the VM 1522 from the VM 1512, a combination between the MAC address of the VM serving as a transmission source (transmission source MAC address) "A0" and the destination MAC address "m1" into a combination between the transmission source MAC address "A0" and the destination MAC address "A1". The address conversion unit 1528 similarly converts, with traffic data addressed to the VM 1522 from the VM 1512, a combination between the transmission source MAC address "A0" and each of the destination MAC addresses "m2" to "m4" into a combination between the transmission source MAC address "A0" and the destination MAC address "A1".

Further, the management device 1532 instructs the destination server 1504 to activate the address conversion unit

1528 included in the corresponding virtual switch 1526 via the network line for management.

The destination server 1504 activates the internally provided address conversion unit 1528 based on the instructions from the management device 1532. Thus, with the virtual switch 1526, the above-mentioned set MAC address conversion processing is enabled, and the above-mentioned MAC address conversion processing will be executed on traffic data to be received from the corresponding switch device 1506-4.

Next, in step S1608, the management device 1532 transmits information of the virtual MAC addresses "m1" to "m4" assigned in step S1602, and the MAC address "A1" of the destination VM 1522 to the server (transmission source server) 1502 to which the transmission source VM 1512 belongs, via the network line for management.

The management device 1532 further instructs the transmission source server 1502 to set the MAC address conversion processing based on the virtual MAC addresses "m1" to "m4" via the network line for management. The transmission source server 1502 sets the MAC address conversion processing based on the virtual MAC addresses "m1" to "m4" at the internal address conversion unit 1518 based on the instructions from the management device 1532.

For example, the address conversion unit 1518 generates an address conversion table, and in the event that the virtual switch 1316 has received traffic data from the corresponding VM 1512, converts the destination MAC address "A1" into one of the virtual MAC addresses "m1" to "m4" in the received traffic data, based on the generated address conversion table. As will be described later, which virtual MAC address of which virtual MAC addresses "m1" to "m4" into which to convert is specified by the management device 1532.

Next, in step S1610, the management device 1532 instructs the transmission source server 1502 to activate the address conversion unit 1518 included in the corresponding virtual switch 1516 and to enable the MAC address conversion processing to convert the destination MAC address "A1" into the virtual MAC address "m1", via the network line for management.

The transmission source server 1502 activates the address conversion unit 1518 provided to the virtual switch 1516, and enables the MAC address conversion processing to convert the destination MAC address "A1" into the virtual MAC address "m1", based on the instructions from the management device 1532. Thus, the MAC address conversion processing to convert the destination MAC address "A1" into the virtual MAC address "m1" will be executed on traffic data to be transmitted to the corresponding switch device 1506-1.

Next, in step S1612, the transmission source server 1502 and destination server 1504 start communication of traffic data. Here, the transmission source server 1502 and destination server 1504 use the communication path specified by the virtual MAC address "m1" (communication path illustrated in a heavy solid line in FIG. 15) for communication.

Next, in step S1614, the transmission source server 1502 detects that a failure has occurred at a switch device positioned on the communication path specified by the virtual MAC address "m1" (communication path illustrated in a heavy solid line in FIG. 15) in the middle of communication with the destination server 1504 being performed. With the example illustrated in FIG. 15, it is detected that a failure has occurred in the switch device 1506-6. According to occurrence of the failure, the communication path between the transmission source server 1502 and the destination server 1504 is blocked, and accordingly, communication between the transmission source server 1502 and the destination server 1504 is interrupted on this stage.

Next, in step S1616, the management device 1532 receives management information from the transmission source server 1502 and switch device 1506-6, thereby recognizing that the failure has occurred in the switch device 1506-6 based on the received management information. The management device 1532 then instructs the transmission source server 1502 to enable MAC address conversion processing to convert the destination MAC address "A1" into the virtual MAC address "m2" at the address conversion unit 1518 included in the corresponding virtual switch 1516, via the network line for management.

The transmission source server 1502 invalidates the MAC address conversion processing to convert the destination MAC address "A1" into the virtual MAC address "m1" at the address conversion unit 1518 provided to the virtual switch 1516, and also enables the MAC address conversion processing to convert the destination MAC address "A1" into the virtual MAC address "m2", based on the instructions from the management device 1532. Thus, the MAC address conversion processing to convert the destination MAC address "A1" into the virtual MAC address "m2" will be executed on traffic data to be transmitted to the corresponding switch device 1506-1.

Next, in step S1618, the transmission source server 1502 and destination server 1504 resume communication of traffic data. Here, the transmission source server 1502 and destination server 1504 use the communication path specified by the virtual MAC address "m2" (communication path illustrated in a heavy dashed line in FIG. 15) for communication as an alternative path of the communication path where the failure has occurred (communication path illustrated in a heavy solid line in FIG. 15).

According to the processing from step S1602 to step S1618 described above, in the event that a failure has occurred in the switch device 1506-6 on the communication path to be used for communication between the servers 1502 and 1504 (communication path illustrated in a heavy solid line in FIG. 15), the communication path to be used for communication between the servers 1502 and 1504 may rapidly be switched to another already established alternative path (communication path illustrated in a heavy dashed line in FIG. 15) by changing the setting of the MAC address conversion processing at the address conversion unit 1518.

Accordingly, with a data center network system, even in the event that a failure has occurred in a switch device on a communication path established between two servers, the communication path between the two servers may rapidly be switched to an alternative communication path.

According to the present embodiment, with a network system such as a data center network, at the time of movement of a VM, a communication path as to the moved VM may be switched to a newly established communication path without interruption of communication.

As described above, though description has been made regarding a network system and a communication control method according to exemplified embodiments of the present technology, the present technology is not restricted to the specific disclosed embodiments, and various modifications and changes may be performed without departing from the scope of the technical idea laid forth in the Claims.

Also, the techniques disclosed in the embodiments may be combined as appropriate as long as the techniques are not mutually conflicted.

All examples and conditional language recited herein are intended for pedagogical purposes to aid the reader in understanding the invention and the concepts contributed by the inventor to furthering the art, and are to be construed as being without limitation to such for example recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control method for a network system, the communication control method comprising:
    establishing a first communication path from a first virtual machine to be executed at a first information processing device to a second virtual machine to be executed at a second information processing device, using a plurality of switch devices, the first communication path being used for a first communication and a second communication, the first communication having a first priority corresponding to a type of a first application program that executes the first communication, the second communication having a second priority lower than the first priority, the second priority corresponding to a type of a second application program that executes the second communication;
    establishing a second communication path and a third communication path from the first information processing device to a third information processing device using the plurality of switch devices before migrating the second virtual machine from the second information processing device to the third information processing device, the second communication path being different from the first communication path, the third communication path being different from the first communication path and having a lower quality than a quality of the second communication path; and
    after migrating the second virtual machine from the second information processing device to the third information processing device, executing the first communication through the second communication path and executing the second communication through the third communication path.

2. The communication control method according to claim 1,
    wherein the first virtual machine has a first address, and the second virtual machine has a second address,
    wherein the communication control method comprises:
    assigning a third address, which differs from the first address and the second address, to the third information processing device, and
    wherein the establishing the second communication path is executed based on the assigned third address.

3. The communication control method according to claim 2, comprising:
    enabling a first address conversion processing arranged to convert the third address into the second address, using the third information processing device; and
    enabling a second address conversion processing arranged to covert the second address into the third address before migrating the second virtual machine from the second information processing device to the third information processing device, using the first information processing device;
    wherein the establishing a communication path from the first virtual machine to the second virtual machine is executed based on the established second communication path, and the enabled first address conversion processing and the second address conversion processing.

4. The communication control method according to claim 3, comprising:
    retrieving the third address using the management device by invalidating the first address conversion processing and the second address conversion processing after migrating the second virtual machine from the second information processing device to the third information processing device, and deleting the second communication path.

5. The communication control method according to claim 2, wherein the third information processing device includes a first virtual switch, and the third address is assigned to the first virtual switch.

6. The communication control method according to claim 5, comprising:
    transmitting a first reply including the third address, which is a reply for a first request to request notification of the third address, using the first virtual switch;
    wherein the second communication path is established by the plurality of switch devices receiving the first reply.

7. The communication control method according to claim 3, wherein the third information processing device includes a first virtual switch, the first information processing device includes a second virtual switch, the first address conversion processing is performed at the first virtual switch, and the second address conversion processing is performed at the second virtual switch.

8. The communication control method according to claim 7, wherein the second communication path is established between the first virtual switch and the second virtual switch.

9. The communication control method according to claim 7, wherein migration of the second virtual machine from the second information processing device to the third information processing device is performed by live migration.

10. The communication control method according to claim 1, comprising:
    establishing a third communication path from the first virtual machine to the second virtual machine migrated to the third information processing device when the second communication path is established after migrating the second virtual machine from the second information processing device to the third information processing device, using a management device and the plurality of switch devices.

11. The communication control method according to claim 10, comprising:
    deleting the second communication path using the management device and the plurality of switch devices after the third communication path is established.

12. The communication control method according to claim 1, further comprising:
    executing an address conversion processing using the first information processing device;
    when communication from the first information processing device to the second information processing device is the first communication, converting a destination address of the second information processing device into a first address to specify the first communication path; and
    at the time of the second communication, converting a destination address of the second information processing device is converted into a second address to specify the second communication path.

13. The communication control method according to claim 1, further comprising:
- assigning a plurality of addresses to specify a plurality of candidate paths, from the first virtual machine having a first address provided to the first information processing device to the second virtual machine having a second address provided to the second information processing device, to the second information processing device;
- executing a first address conversion processing to convert the plurality of addresses into the second address using the second information processing device;
- executing a second address conversion processing to convert the second address into a third address of the plurality of addresses using the first information processing device; and
- executing a third address conversion processing to convert the second address into a fourth address different from the third address of the plurality of addresses using the first information processing device, when a failure occurs at a candidate path specified by the third address.

14. A network system comprising:
- a first information processing device;
- a second information processing device coupled to the first information processing device via a plurality of switch devices;
- a third information processing device coupled to the first information processing device via the plurality of switch devices; and
- a management device configured to manage the first information processing device, the second information processing device, and the third information processing device,
- wherein a communication path between the first information processing device, the second information processing device, and the third information processing device is established by the plurality of switch devices based on control of the management device, and
- wherein the plurality of switch devices comprises:
- a processor configured to execute a process comprising:
- establishing a first communication path from a first virtual machine to be executed at the first information processing device to a second virtual machine to be executed at the second information processing device, the first communication path being used for a first communication and a second communication, the first communication having a first priority corresponding to a type of a first application program that executes the first communication, the second communication having a second priority lower than the first priority, the second priority corresponding to a type of a second application program that executes the second communication,
- establishing a second communication path and a third communication path from the first information processing device to the third information processing device before migrating the second virtual machine from the second information processing device to the third information processing device the second communication path being different from the first communication path, the third communication path being different from the first communication path and having a lower quality than a quality of the second communication path, and
- after migrating the second virtual machine from the second information processing device to the third information processing device, executing the first communication through the second communication path and executing the second communication through the third communication path.

* * * * *